(12) United States Patent
Yu et al.

(10) Patent No.: US 12,333,694 B2
(45) Date of Patent: Jun. 17, 2025

(54) IMAGE PROCESSING METHOD AND APPARATUS

(71) Applicant: HUAWEI TECHNOLOGIES CO., LTD., Shenzhen (CN)

(72) Inventors: Quanhe Yu, Beijing (CN); Weiwei Xu, Hangzhou (CN); Hu Chen, Munich (DE); Dongsheng Wu, Shenzhen (CN); Le Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 452 days.

(21) Appl. No.: 17/721,602

(22) Filed: Apr. 15, 2022

(65) Prior Publication Data

US 2022/0237754 A1  Jul. 28, 2022

Related U.S. Application Data

(63) Continuation of application No. PCT/CN2020/113525, filed on Sep. 4, 2020.

(30) Foreign Application Priority Data

Oct. 18, 2019 (CN) .......................... 201910996393.9

(51) Int. Cl.
G06K 9/00 (2022.01)
G06T 5/92 (2024.01)
(52) U.S. Cl.
CPC ...... *G06T 5/92* (2024.01); *G06T 2207/20208* (2013.01)
(58) Field of Classification Search
CPC ........................................... G06T 2207/20208
See application file for complete search history.

(56) References Cited

U.S. PATENT DOCUMENTS

2017/0116963 A1   4/2017  Wanat et al.

FOREIGN PATENT DOCUMENTS

| CN | 105745914 A | 7/2016 |
| CN | 106981054 A | 7/2017 |

(Continued)

OTHER PUBLICATIONS

Zhao Lanfei et al., High Dynamic Range Imaging Based on Cubic Spline Interpolation, Journal of Computer-Aided Design and Computer Graphics, vol. 27, No. 07, Jul. 2015, with the English Abstract, 12 pages.

*Primary Examiner* — Molly Wilburn
*Assistant Examiner* — Aidan Keup
(74) *Attorney, Agent, or Firm* — Rimon PC

(57) ABSTRACT

This application provides an image processing method, including: adaptively determining at least one interpolation point based on feature information or dynamic metadata of a to-be-processed image, and determining the at least one interpolation point and a modified spline curve that passes through the at least one interpolation point, where the modified spline curve includes at least one of a linear spline curve or a cubic spline curve; and performing tone mapping on the to-be-processed image based on a modified tone mapping curve, where the modified tone mapping curve includes at least a part of an initial tone mapping curve and the modified spline curve. According to the method provided in this application, the tone mapping curve can be adaptively modified based on a scene requirement, so that images in various scenes can have a good display effect.

5 Claims, 17 Drawing Sheets

(56) References Cited

FOREIGN PATENT DOCUMENTS

| | | | | |
|---|---|---|---|---|
| CN | 107016647 | A | 8/2017 | |
| CN | 108496356 | A | 9/2018 | |
| CN | 109785275 | A | 5/2019 | |
| CN | 110246086 | A | 9/2019 | |
| IN | 201817047260 | A * | 12/2018 | ............... G06T 1/20 |
| JP | 2010074222 | A | 4/2010 | |
| WO | 2018152063 | A1 | 8/2018 | |

* cited by examiner

1001: Obtain first coordinates TH1, TH2, and TH3 of a first interpolation point, a second interpolation point, and a third interpolation point

1002: Respectively calculate second coordinates VA1 and VA3 of the first interpolation point and the third interpolation point on an initial tone mapping curve

1003: Calculate a second coordinate VA2 of the second interpolation point on a first straight line, where the first straight line is a straight line on which the first interpolation point and the third interpolation point are located

1004: Determine VA1 as the first coefficient MA1 of the first spline curve, and determine VA2 as the first coefficient MA2 of the second spline curve

1005: Calculate a first-order derivative GD1 of the initial tone mapping curve at the first interpolation point and a first-order derivative GD3 of the initial tone mapping curve at the third interpolation point, and determine GD1 as the second coefficient MB1 of the first spline curve

1006: Construct a system of equations based on TH1, TH2, TH3, VA2, VA3, and a derivative relationship between the first spline curve and the second spline curve at the second interpolation point

1007: Solve the system of equations that includes the first equation, the second equation, and the third equation, to obtain MC1, MD1, and MB2

FIG. 10

IMAGE PROCESSING METHOD AND APPARATUS

CROSS-REFERENCE TO RELATED APPLICATIONS

This application is a continuation of International Application No. PCT/CN2020/113525, filed on Sep. 4, 2020, which claims priority to Chinese Patent Application No. 201910996393.9, filed on Oct. 18, 2019. The disclosures of the aforementioned applications are hereby incorporated by reference in their entireties.

TECHNICAL FIELD

This application relates to the field of image processing, and more specifically, to an image processing method and apparatus.

BACKGROUND

A dynamic range (DR) may be used to represent a ratio of a maximum grayscale value to a minimum grayscale value of a picture. The dynamic range may be further used to represent a ratio of a maximum luminance value to a minimum luminance value of the picture. A dynamic range in the real world is between $10^{-3}$ and $10^6$, and is referred to as a high dynamic range (HDR). A display capability of a display device is generally limited, and is far below a luminance range in the real world. For example, a bright object in the real world may have a luminance value of 2000 nits. The maximum luminance at which the display device can perform is only 500 nits. If no processing is performed, the display device cannot reproduce the object in the real world. In another case, a dark object in the real world, for example, may have a luminance value of 10 nits. The minimum luminance at which the display device can perform is 100 nits. If no processing is performed, the display device cannot reproduce the object in the real world. This application provides a method, so that the display device vividly and truly reproduces a scene in the real world.

SUMMARY

This application provides an image processing method and apparatus, to improve a tone mapping effect of a display device.

According to a first aspect, an image processing method is provided, including: determining a first coordinate of at least one interpolation point based on feature information or dynamic metadata of a to-be-processed image; determining at least one second coordinate and at least one first-order derivative based on the first coordinate of the at least one interpolation point; determining coefficients of a modified spline curve based on the first coordinate of the at least one interpolation point, the at least one second coordinate, and the at least one first-order derivative, where the modified spline curve includes at least one of a linear spline curve or a cubic spline curve; and performing tone mapping on the to-be-processed image based on a modified tone mapping curve, where the modified tone mapping curve includes at least a part of an initial tone mapping curve and the modified spline curve.

A location of the interpolation point is adaptively determined based on the feature information of the to-be-processed image or the dynamic metadata of the to-be-processed image, for example, luminance information and pixel distribution information, and a modified spline curve that is most applicable to the to-be-processed image is flexibly determined based on the interpolation point. Tone mapping is performed on the to-be-processed image based on the modified tone mapping curve. Because the tone mapping curve is not static but is adaptively adjusted based on the to-be-processed image or the dynamic metadata, images in various scenes may have a good display effect.

In the image processing method provided in this embodiment of this application, a curve can be adaptively modified based on a scene requirement, to achieve a specified effect, for example, increase luminance, increase contrast, and blur partial information. For example, a display effect of a dark-region detail is improved by increasing dark-region luminance, and contrast may be increased by decreasing dark-region luminance, or a large quantity of bits may be allocated to a bright region to display a bright-region detail.

In a possible implementation, the at least one interpolation point includes a first interpolation point, the modified spline curve includes a first spline curve, the first spline curve is a linear spline curve that passes through the first interpolation point, and the coefficients of the modified spline curve include a first coefficient MA0 and a second coefficient MB0. The determining at least one second coordinate and at least one first-order derivative based on the first coordinate of the at least one interpolation point includes: determining a second coordinate VA1 of the first interpolation point on the initial tone mapping curve and a first-order derivative GD1 of the initial tone mapping curve at the first interpolation point based on a first coordinate TH1 of the first interpolation point. The determining coefficients of a modified spline curve based on the first coordinate of the at least one interpolation point, the at least one second coordinate, and the at least one first-order derivative includes: determining GD1 as a second coefficient MB0 of the first spline curve, and determining VA1 as a first coefficient MA0 of the first spline curve.

In this embodiment of this application, only one interpolation point needs to be determined. Optionally, the first interpolation point is close to a bright-region endpoint. This embodiment of this application corresponds to a case in which an overall scene of an image is bright. In this case, the bright region is modified, to better display a bright-region detail of the image. Specifically, tone mapping is performed, based on a linear function, on a pixel region whose luminance is greater than a preset threshold (TH1), and the first spline curve is smoothly connected to the initial tone mapping curve at the first interpolation point, to prevent an unsmooth tone mapping curve from affecting a tone mapping effect.

In a possible implementation, the at least one interpolation point includes a first interpolation point and a second interpolation point, the modified spline curve includes a first spline curve, the first spline curve is a cubic spline curve that passes through the first interpolation point and the second interpolation point, and the coefficients of the modified spline curve include a first coefficient MA1, a second coefficient MB1, a third coefficient MC1, and a fourth coefficient MD1. The determining at least one second coordinate and at least one first-order derivative based on the first coordinate of the at least one interpolation point includes: respectively calculating second coordinates VA1 and VA2 of the first interpolation point and the second interpolation point on the initial tone mapping curve based on a first coordinate TH1 of the first interpolation point and a first coordinate TH2 of the second interpolation point; and calculating a first-order derivative GD1 of the initial tone mapping curve at the first interpolation point and a first-order derivative GD2 of the initial tone mapping curve at the second interpolation point based on TH1 and TH2. The determining coefficients of a modified spline curve based on the first coordinate of the at least one interpolation point, the at least one second coordinate, and the at least one first-order derivative includes: determining VA1 as a first coefficient MA1 of the first spline curve; determining GD1 as a second coefficient MB1 of the first spline curve; constructing, based on TH1, TH2, VA2, and GD2, a system of equations that includes two equations; and solving the system of equations to obtain a third coefficient MC1 and a fourth coefficient MD1 of the first spline curve.

In this embodiment of this application, two interpolation points need to be determined. In an optional case, the two interpolation points are close to a bright-region endpoint. This embodiment of this application corresponds to a case in which an overall scene of an image is bright. In this case, the bright region is modified, to better display a bright-region detail of the image. Specifically, tone mapping is performed on a pixel region between the first interpolation point and the second interpolation point based on a cubic spline function, and the cubic spline function is smoothly connected to the initial tone mapping curve at the first interpolation point, to prevent an unsmooth tone mapping curve from affecting a tone mapping effect.

In a possible implementation, the constructing, based on TH1, TH2, VA2, and GD2, a system of equations that includes two equations includes: enabling a second coordinate of the second interpolation point on the first spline curve to be a sum of VA2 and S1, to obtain a first equation, where S1 is a coordinate offset value included in the dynamic metadata; and enabling a first-order derivative of the first spline curve at the second interpolation point to be a sum of GD2 and S2, to obtain a second equation, where S2 is a slope offset value included in the dynamic metadata.

In a possible implementation, the at least one interpolation point includes a first interpolation point, the modified spline curve includes a first spline curve, the first spline curve is a linear spline function that passes through the origin and the first interpolation point, and the coefficients of the modified spline curve include a first-order derivative MB0 of the first spline curve. Before the determining at least one second coordinate and at least one first-order derivative based on the first coordinate of the at least one interpolation point, the method further includes: obtaining the first-order derivative MB0 of the first spline curve based on at least one of a maximum luminance value maxL of the to-be-processed image and an average luminance value avgL of the to-be-processed image that are included in the dynamic metadata.

In a possible implementation, the at least one interpolation point further includes a second interpolation point and a third interpolation point, the modified spline curve further includes a second spline curve and a third spline curve, the second spline curve is a cubic spline curve that passes through the first interpolation point and the second interpolation point, the third spline curve is a cubic spline curve that passes through the second interpolation point and the third interpolation point, and the coefficients of the modified spline curve further include a first coefficient MA1, a second coefficient MB1, a third coefficient MC1, and a fourth coefficient MD1 of the second spline curve, and a first coefficient MA2, a second coefficient MB2, a third coefficient MC2, and a fourth coefficient MD2 of the third spline curve. The determining at least one second coordinate and at least one first-order derivative based on the first coordinate of the at least one interpolation point includes: calculating a second coordinate VA1 of the first interpolation point on the first spline curve based on a first coordinate TH1 of the first interpolation point and MB0; calculating a second coordinate VA3 of the third interpolation point on the initial tone mapping curve based on a first coordinate TH3 of the third interpolation point; calculating a second coordinate VA2 of the second interpolation point on a first straight line based on a first coordinate TH2 of the second interpolation point, where the first straight line is a straight line on which the first interpolation point and the third interpolation point are located; and calculating a first-order derivative GD3 of the initial tone mapping curve at the third interpolation point based on TH3.

In a possible implementation, the determining coefficients of a modified spline curve based on the first coordinate of the at least one interpolation point, the at least one second coordinate, and the at least one first-order derivative includes: determining VA1 as the first coefficient MA1 of the second spline curve; determining MB0 as the second coefficient MB1 of the second spline curve; determining VA2 as the first coefficient MA2 of the third spline curve; constructing, based on TH1, TH2, TH3, VA2, VA3, GD3, and a derivative relationship between the second spline curve and the third spline curve at the second interpolation point, a system of equations that includes five equations; and solving the system of equations that includes five equations, to obtain MC1, MD1, MB2, MC2, and MD2.

This embodiment of this application corresponds to a case in which an overall scene of an image is dark. In this case, a dark region is modified, to better display a dark-region detail of the image, so that a pixel whose luminance is lower than a display capability of a display device can have a good display effect on the display device. Specifically, tone mapping is performed, based on a linear spline function formula, on pixels that are lower than a first threshold (TH1), so that dark-region detail information of the part is better reserved. Then, a smooth transition between the linear spline function and the initial tone mapping curve is implemented based on a cubic spline function, to prevent an unsmooth tone mapping curve from affecting a tone mapping effect. It should be understood that in this embodiment of this application, there are two cubic spline curves. In an optional case, there may be only one cubic spline curve, and the first spline curve is smoothly connected to the initial tone mapping curve by using one cubic spline function. In this case, only two interpolation points need to be determined.

Specifically, the first spline curve increases dark-region luminance compared with a base curve. This is equivalent to allocating more bits to the dark region. The two cubic spline functions implement a smooth transition between the first spline curve and the initial tone mapping curve, and enhancement or weakening processing may be performed on a modified region by controlling a point on and a slope of the curve.

In a possible implementation, the constructing, based on TH1, TH2, TH3, VA2, VA3, GD3, and a derivative relationship between the second spline curve and the third spline curve at the second interpolation point, a system of equations that includes five equations includes: enabling a second coordinate of the second interpolation point on the second spline curve to be VA2, to obtain a first equation; enabling a second coordinate of the third interpolation point on the third spline curve to be VA3, to obtain a second equation; enabling a first-order derivative of the third spline curve at the third interpolation point to be GD3, to obtain a third equation; enabling first-order derivatives of the second spline curve and the third spline curve at the second interpolation point to be equal, to obtain a fourth equation; and enabling second-order derivatives of the second spline curve and the third spline curve at the second interpolation point to be equal, to obtain a fifth equation.

In a possible implementation, the determining a first coordinate of at least one interpolation point based on feature information or dynamic metadata of a to-be-processed image includes: determining the first coordinate TH1 of the first interpolation point based on the at least one of the maximum luminance value maxL of the to-be-processed image and the average luminance value avgL of the to-be-processed image that are included in the dynamic metadata; TH2=TH1+B; and TH3=TH2+C*TH2−D*CH2, where B, C, and D are constants. Optionally, B, C, and D are constants. In an optional case, the constant may be included in the dynamic metadata. In an optional case, B, C, and D may be directly defined in related program code, and do not need to be obtained from the dynamic metadata.

In a possible implementation, the at least one interpolation point includes a first interpolation point, a second interpolation point, and a third interpolation point, the modified spline curve includes a first spline curve and a second spline curve, the first spline curve is a cubic spline curve that passes through the first interpolation point and the second interpolation point, the second spline curve is a cubic spline curve that passes through the second interpolation point and the third interpolation point, and the coefficients of the modified spline curve include a first coefficient MA1, a second coefficient MB1, a third coefficient MC1, and a fourth coefficient MD1 of the first spline curve, and a first coefficient MA2, a second coefficient MB2, a third coefficient MC2, and a fourth coefficient MD2 of the second spline curve. The determining at least one second coordinate and at least one first-order derivative based on the first coordinate of the at least one interpolation point includes: respectively calculating second coordinates VA1 and VA3 of the first interpolation point and the third interpolation point on the initial tone mapping curve based on a first coordinate TH1 of the first interpolation point and a first coordinate TH3 of the third interpolation point; calculating a second coordinate VA2 of the second interpolation point on a first straight line based on a first coordinate TH2 of the second interpolation point, where the first straight line is a straight line on which the first interpolation point and the third interpolation point are located; and calculating a first-order derivative GD1 of the initial tone mapping curve at the first interpolation point and a first-order derivative GD3 of the initial tone mapping curve at the third interpolation point.

This embodiment of this application corresponds to a case in which an image includes a pixel located in a specific luminance range. In this case, the specific luminance range is mainly modified, to better display a luminance detail of the image in the range. Specifically, tone mapping is performed on a pixel between the first interpolation point and the second interpolation point and a pixel between the second interpolation point and the third interpolation point based on a cubic spline function, to improve a display effect of the part of pixels. Further, a smooth transition exists between the first spline curve and the second spline curve and between the initial tone mapping curve and each of the first spline curve and the second spline curve, to prevent an unsmooth tone mapping curve from affecting a tone mapping effect.

In a possible implementation, the determining coefficients of a modified spline curve based on the first coordinate of the at least one interpolation point, the at least one second coordinate, and the at least one first-order derivative includes: determining VA1 as the first coefficient MA1 of the first spline curve; determining GD1 as the second coefficient MB1 of the first spline curve; determining a sum of VA2 and an offset value as the first coefficient MA2 of the second spline curve, where the offset value is 0, a positive number, or a negative number; constructing, based on TH1, TH2, TH3, VA2, VA3, GD3, and a derivative relationship between the first spline curve and the second spline curve at the second interpolation point, a system of equations that includes five equations; and solving the system of equations that includes five equations, to obtain MC1, MD1, MB2, MC2, and MD2.

Optionally, the offset value is included in the dynamic metadata.

In a possible implementation, the constructing, based on TH1, TH2, TH3, VA2, VA3, GD3, and a derivative relationship between the first spline curve and the second spline curve at the second interpolation point, a system of equations that includes five equations includes: enabling a second coordinate of the second interpolation point on the first spline curve to be VA2, to obtain a first equation; enabling a second coordinate of the third interpolation point on the second spline curve to be VA3, to obtain a second equation; enabling a first-order derivative of the second spline curve at the third interpolation point to be GD3, to obtain a third equation; enabling first-order derivatives of the first spline curve and the second spline curve at the second interpolation point to be equal, to obtain a fourth equation; and enabling second-order derivatives of the first spline curve and the second spline curve at the second interpolation point to be equal, to obtain a fifth equation.

In a possible implementation, the at least one interpolation point includes a first interpolation point, a second interpolation point, and a third interpolation point, the modified spline curve includes a first spline curve and a second spline curve, the first spline curve is a cubic spline curve that passes through the first interpolation point and the second interpolation point, the second spline curve is a linear spline curve that passes through the second interpolation point and the third interpolation point, and the coefficients of the modified spline curve include a first coefficient MA1, a second coefficient MB1, a third coefficient MC1, and a fourth coefficient MD1 of the first spline curve, and a first coefficient MA2 and a second coefficient MB2 of the second spline curve. The determining at least one second coordinate and at least one first-order derivative based on the first coordinate of the at least one interpolation point includes: respectively calculating second coordinates VA1 and VA3 of the first interpolation point and the third interpolation point on the initial tone mapping curve based on a first coordinate TH1 of the first interpolation point and a first coordinate TH3 of the third interpolation point; calculating a second coordinate VA2 of the second interpolation point on a first straight line based on a first coordinate TH2 of the second interpolation point, where the first straight line is a straight line on which the first interpolation point and the third interpolation point are located; and calculating a first-order derivative GD1 of the initial tone mapping curve at the first interpolation point.

In a possible implementation, the determining coefficients of a modified spline curve based on the first coordinate of the at least one interpolation point, the at least one second coordinate, and the at least one first-order derivative includes: determining VA1 as the first coefficient MA1 of the first spline curve; determining GD1 as the second coefficient MB1 of the first spline curve; determining a sum of VA2 and an offset value as the first coefficient MA2 of the second spline curve, where the offset value is 0, a positive number, or a negative number; constructing, based on TH1, TH2, TH3, VA2, VA3, and a derivative relationship between the first spline curve and the second spline curve at the second interpolation point, a system of equations that includes three equations; and solving the system of equations that includes three equations, to obtain MC1, MD1, and MB2.

It should be understood that the offset value may be included in the dynamic metadata.

This embodiment of this application corresponds to a case in which an overall scene of an image is bright. In this case, a bright region is modified, to better display a bright-region detail of the image. Specifically, tone mapping is performed on a pixel region between the second interpolation point and the third interpolation point based on a linear spline curve, and a linear spline function is smoothly connected to the initial tone mapping curve based on a cubic spline function between the first interpolation point and the second interpolation point, to prevent an unsmooth tone mapping curve from affecting a tone mapping effect.

In a possible implementation, the constructing, based on TH1, TH2, TH3, VA2, VA3, and a derivative relationship between the first spline curve and the second spline curve at the second interpolation point, a system of equations that includes three equations includes: enabling a second coordinate of the second interpolation point on the first spline curve to be VA2, to obtain a first equation; enabling a second coordinate of the third interpolation point on the second spline curve to be VA3, to obtain a second equation; and enabling first-order derivatives of the first spline curve and the second spline curve at the second interpolation point to be equal, to obtain a third equation.

In a possible implementation, the at least one interpolation point constitutes at least one modified range, one modified range corresponds to one modified spline curve, and the performing tone mapping on the to-be-processed image based on a modified tone mapping curve includes: when a to-be-processed pixel is located in the at least one modified range, performing tone mapping on the to-be-processed pixel based on the modified spline curve; or when the to-be-processed pixel is outside the at least one modified range, performing tone mapping on the to-be-processed pixel based on the initial tone mapping curve.

In a possible implementation, before the determining a first coordinate of at least one interpolation point based on feature information or dynamic metadata of a to-be-processed image, the method further includes: determining a target scene mode applicable to the to-be-processed image based on a mode indication value in the dynamic metadata, where the at least one interpolation point and the modified spline curve are related to the target scene mode.

For example, a quantity of determined interpolation points and a quantity of linear spline curves and cubic spline curves that are included in the modified spline curve are related to a scene mode applicable to the to-be-processed image. When the overall to-be-processed image is dark, the first interpolation point is located in a region near a dark-region endpoint, and mapping is performed on a pixel between the origin and the first interpolation point by using the linear spline curve, so that the dark-region detail can be better displayed. When the overall to-be-processed image is bright, a plurality of interpolation points are located in a region near the bright-region endpoint.

In a possible implementation, the initial tone mapping curve includes one of the following formulas:

$$L' = a \times \left(\frac{p \times L}{(p-1) \times L + 1}\right)^m + b;$$

$$F(L) = a \times \left(\frac{p \times L^n}{(k_1 \times p - k_2) \times L^n + k_3}\right)^m + b;$$

$$L' = a \times L + b;$$

$$L' = \frac{c_1 + c_2 \times L^n}{1 + c_3 \times L^n};$$

$$L' = \sum_{p=0}^{N} \binom{N}{\rho} \times L^\rho \times (1-L)^{N-\rho} \times P_\rho,$$

where L represents a linear signal value, L' represents a non-linear signal value, p, a, m, b, $c_1$, $c_2$, $c_3$, n, N, and ρ are all dynamic range mapping coefficients, and 0≤L≤1.

In this embodiment of this application, the method provided in the first aspect may be applied to a plurality of initial tone mapping curves, and is highly flexible.

In a possible implementation, the plurality of interpolation points include a first interpolation point, a second interpolation point, and a third interpolation point. The spline function includes a first spline function that passes through the first interpolation point and the second interpolation point, and a second spline function that passes through the second interpolation point and the third interpolation point. The first spline function includes a first coefficient MA1, a second coefficient MB1, a third coefficient MC1, and a fourth coefficient MD1. The second spline function includes a first coefficient MA2, a second coefficient MB2, a third coefficient MC2, and a fourth coefficient MD2.

In a possible implementation, the first interpolation point is not located on the initial tone mapping curve, and determining a spline function that passes through the plurality of interpolation points includes: determining a second coordinate VA1 of the first interpolation point on a linear spline function, where the linear spline function is a linear spline function between the origin and the first interpolation point; and determining VA1 as the first coefficient MA1 of the first spline function.

In a possible implementation, the first interpolation point is located on the initial tone mapping curve, and determining a spline function that passes through the plurality of interpolation points includes: determining a second coordinate VA1 of the first interpolation point on the initial tone mapping curve; and determining VA1 as the first coefficient MA1 of the first spline function.

In a possible implementation, determining a spline function that passes through the plurality of interpolation points further includes: determining a second coordinate VA3 of the third interpolation point on the initial tone mapping curve; determining a second coordinate VA2 of the second interpolation point on a first straight line, where the first straight line is a straight line on which the first interpolation point and the third interpolation point are located; and determining VA2 as the first coefficient MA2 of the second spline function.

In a possible implementation, the dynamic metadata further includes a second coordinate offset of the second interpolation point, and determining a spline function that passes through the plurality of interpolation points further includes: determining a second coordinate VA3 of the third interpolation point on the initial tone mapping curve; determining a second coordinate VA2 of the second interpolation point on a first straight line, where the first straight line is a straight line on which the first interpolation point and the third interpolation point are located; and determining a sum of VA2 and the second coordinate offset as the first coefficient MA2 of the second spline function.

In a possible implementation, determining a spline function that passes through the plurality of interpolation points further includes: determining a first-order derivative of the linear spline function as MB1; and determining a first-order derivative of the initial tone mapping curve at the third interpolation point as MB2.

In a possible implementation, determining a spline function that passes through the plurality of interpolation points further includes: determining a first-order derivative of the initial tone mapping curve at the first interpolation point as MB1; and determining a first-order derivative of the initial tone mapping curve at the third interpolation point as MB2.

In a possible implementation, determining a spline function that passes through the plurality of interpolation points further includes: enabling a second coordinate value of the second interpolation point on the first spline function to be VA2, to obtain a first equation; enabling a second coordinate value of the third interpolation point on the second spline function to be VA3, to obtain a second equation; enabling a first-order derivative of the second spline function at the third interpolation point to be the first-order derivative of the initial tone mapping curve at the third interpolation point, to obtain a third equation; enabling first-order derivatives of the first spline function and the second spline function at the second interpolation point to be equal, to obtain a fourth equation; enabling second-order derivatives of the first spline function and the second spline function at the second interpolation point to be equal, to obtain a fifth equation; and solving the first equation, the second equation, the third equation, the fourth equation, and the fifth equation, to obtain the third coefficient MC1 and the fourth coefficient MD1 of the first spline function, and the third coefficient MC2 and the fourth coefficient MD2 of the second spline function.

In a possible implementation, the first interpolation point and the third interpolation point are located on the initial tone mapping curve, and determining a spline function that passes through the plurality of interpolation points includes: respectively determining second coordinate values VA1 and VA3 of the first interpolation point and the third interpolation point on the initial tone mapping curve; determining a corresponding second coordinate value VA2 of the second interpolation point on a first straight line, where the first straight line is a straight line on which the first interpolation point and the third interpolation point are located; determining VA1 as the first coefficient MA1 of the first spline function; determining VA2 as the first coefficient MA2 of the second spline function; respectively determining slopes GD1 and GD3 of the initial tone mapping curve at the first interpolation point and the third interpolation point; enabling GD1 to be the second coefficient MB1 of the first spline function; enabling GD3 to be the second coefficient MB2 of the second spline function; enabling a second coordinate value of the second interpolation point on the first spline function to be VA2, to obtain a first equation; enabling a second coordinate value of the third interpolation point on the second spline function to be VA3, to obtain a second equation; enabling a first-order derivative of the second spline function at the third interpolation point to be GD3, to obtain a third equation; enabling first-order derivatives of the first spline function and the second spline function at the second interpolation point to be equal, to obtain a fourth equation; enabling second-order derivatives of the first spline function and the second spline function at the second interpolation point to be equal, to obtain a fifth equation; solving the first equation, the second equation, the third equation, the fourth equation, and the fifth equation, to obtain the third coefficient MC1 and the fourth coefficient MD1 of the first spline function, and the third coefficient MC2 and the fourth coefficient MD2 of the second spline function; determining the first spline function based on MA1, MB1, MC1, and MD1; and determining the second spline function based on MA2, MB2, MC2, and MD2.

In a possible implementation, the first interpolation point is not located on the initial tone mapping curve, and determining a spline function that passes through the plurality of interpolation points includes: determining a second coordinate VA1 of the first interpolation point on a linear spline function as the first coefficient MA1 of the first spline function, where the linear spline function is a straight line that passes through the origin and the first interpolation point; determining a second coordinate VA3 of the third interpolation point on the initial tone mapping curve; determining a second coordinate VA2 of the second interpolation point on a first straight line as the first coefficient MA2 of the second spline function, where the first straight line is a straight line on which the first interpolation point and the third interpolation point are located; determining a first-order derivative of the linear spline function as MB1; determining a first-order derivative of the initial tone mapping curve at the third interpolation point as MB2; enabling a second coordinate value of the second interpolation point on the first spline function to be VA2, to obtain a first equation; enabling a second coordinate value of the third interpolation point on the second spline function to be VA3, to obtain a second equation; enabling a first-order derivative of the second spline function at the third interpolation point to be GD3, to obtain a third equation; enabling first-order derivatives of the first spline function and the second spline function at the second interpolation point to be equal, to obtain a fourth equation; enabling second-order derivatives of the first spline function and the second spline function at the second interpolation point to be equal, to obtain a fifth equation; solving the first equation, the second equation, the third equation, the fourth equation, and the fifth equation, to obtain the third coefficient MC1 and the fourth coefficient MD1 of the first spline function, and the third coefficient MC2 and the fourth coefficient MD2 of the second spline function; determining the first spline function based on MA1, MB1, MC1, and MD1; and determining the second spline function based on MA2, MB2, MC2, and MD2.

In a possible implementation, the dynamic metadata includes a start location L1 of a range of the spline function and an end location L3 of the range of the spline function, and determining a plurality of interpolation points based on the dynamic metadata includes: $TH1=L1/255$, $TH3=L3/255$, and $TH2=(TH1+TH3)/2$. TH1 is a first coordinate of the first interpolation point, TH2 is a first coordinate of the second interpolation point, and TH3 is a first coordinate of the third interpolation point.

In a possible implementation, determining a plurality of interpolation points based on luminance information of the target picture includes: determining the first coordinate TH1 of the first interpolation point based on the following formula:

$$TH1 = \begin{cases} p_{valueL} & maxL > TPH \\ p_{valueL} \times \left(\frac{(maxL - TPL)}{TPH - TPL}\right) + p_{valueH} \times \left(1 - \left(\frac{(maxL - TPL)}{TPH - TPL}\right)\right) & TPL \le maxL \le TPH \\ p_{valueH} & maxL < TPL \end{cases}$$

where maxL is included in the dynamic metadata, and maxL is a maximum luminance value of the to-be-processed image. When the to-be-processed image is received, the first coordinate TH1 of the first interpolation point is calculated based on the foregoing formula and maxL included in the dynamic metadata of the to-be-processed image. PvalueL is a first threshold of a dark-region pixel, PvalueH is a second threshold of the dark-region pixel, and the first threshold is less than the second threshold. For example, a value of PvalueL may be 0.15, and a value of PvalueH may be 0.25. TPH is a third threshold of a bright-region pixel, and TPL is a fourth threshold of the bright-region pixel. For example, a value of TPH may be 0.6, and a value of TPL may be 0.1. In an optional case, maxL in the foregoing formula may be replaced with avgL, or maxL may be replaced with a*maxL+b*avgL, where a and b are constants, 0≤a≤1, and 0≤b≤1.

In a possible implementation, before the determining a second coordinate VA1 of the first interpolation point on a linear spline function, the method further includes:

determining the first-order derivative MB0 of the linear spline function:

$$MB0 = \begin{cases} S_{valueL} & aveL > AvH \\ S_{valueL} \times \left(\frac{(avgL - AvL)}{AvH - AvL}\right) + S_{valueH} \times \left(1 - \left(\frac{(avgL - AvL)}{AvH - AvL}\right)\right) & AvL \le avgL \le AvH \\ S_{valueH} & aveL < AvL \end{cases}$$

where avgL is included in the dynamic metadata, avgL is an average luminance value of the to-be-processed image. When the to-be-processed image is received, a slope MB0 of the first spline curve is calculated based on the foregoing formula and avgL included in the dynamic metadata. AvL is a fifth threshold of an average pixel, and AvH is a sixth threshold of the average pixel. For example, a value of AvL may be 0.15, and a value of AvH may be 0.65. SvalueL is a first slope threshold for luminance increase of a dark-region pixel, SvalueH is a second slope threshold added to the luminance value of the dark-region pixel, and the first slope threshold is less than the second slope threshold. For example, a value of SvalueL may be 1, and a value of SvalueH may be 1.2. In an optional case, avgL in the foregoing formula may be replaced with maxL, or may be replaced with a*maxL+b*avgL, where a and b are constants, 0≤a≤1, and 0≤b≤1.

In a possible implementation, the first spline function f1 is as follows:

$f1 = MD1 \times (L-TH1)^3 + MC1 \times (L-TH1)^2 + MB1 \times (L-TH1)^1 + MA1$

The second spline function f2 is as follows:

$f2 = MD2 \times (L-TH2)^3 + MC2 \times (L-TH2)^2 + MB2 \times (L-TH2)^1 + MA2$

TH1 is the first coordinate of the first interpolation point, TH2 is the first coordinate of the second interpolation point, and L is an independent variable of a function.

In a possible implementation, performing, based on the spline function, tone mapping on a pixel that is in the target picture and that is located in the range of the spline function includes: when the to-be-processed pixel is located between the first interpolation point and the second interpolation point, performing tone mapping on the to-be-processed pixel based on the first spline function; and when the to-be-processed pixel is located between the second interpolation point and the third interpolation point, performing tone mapping on the to-be-processed pixel based on the second spline function.

According to a second aspect, an image processing method is provided, including: determining a mode indication value in dynamic metadata, where the mode indication value is used to indicate a target scene mode applicable to a to-be-processed image; invoking, based on the mode indication value, an obtaining process of a parameter that is of a modified spline curve and that corresponds to the target scene mode, and obtaining the modified spline curve; and performing tone mapping on the to-be-processed image based on a modified tone mapping curve, where the modified tone mapping curve includes at least a part of an initial tone mapping curve and the modified spline curve.

In the image processing method provided in this embodiment of this application, a scene mode applicable to the to-be-processed image is determined based on the mode indication value in the dynamic metadata, and the initial tone mapping curve is properly and flexibly modified, so that an image display effect can be adjusted for regions with different luminance, to enhance a luminance change detail of the image, and bring better visual experience to a user. A plurality of styles of display effects such as softness, vividness, brightness, and dusk may be obtained by performing a plurality of forms of fine-tuning on the tone mapping curve.

In a possible implementation, the invoking, based on the mode indication value, an obtaining process of a parameter that is of a modified spline curve and that corresponds to the target scene mode includes: when the mode indication value is a first preset value, invoking a first obtaining process; when the mode indication value is a second preset value, invoking a second obtaining process; when the mode indication value is a third preset value, invoking a third obtaining process; when the mode indication value is a fourth preset value, invoking a fourth obtaining process; or when the mode indication value is a fifth preset value, invoking a fifth obtaining process.

In a possible implementation, the modified spline curve obtained in the first obtaining process includes a first spline curve, a second spline curve, and a third spline curve, the first spline curve is a linear spline function that passes through an origin and a first interpolation point, the second spline curve is a cubic spline curve that passes through the first interpolation point and a second interpolation point, the third spline curve is a cubic spline curve that passes through the second interpolation point and a third interpolation point, and the invoking a first obtaining process includes: determining a first coordinate TH1 of the first interpolation point based on at least one of a maximum luminance value maxL of the to-be-processed image and an average luminance value avgL of the to-be-processed image that are included in the dynamic metadata; obtaining a first-order derivative MB0 of the first spline curve based on the at least one of the average luminance value avgL of the to-be-processed image and the maximum luminance value maxL of the to-be-processed image that are included in the dynamic metadata; TH2=TH1+B; TH3=TH2+C*TH2−D*CH2, where TH2 is a first coordinate of the second interpolation point, TH3 is a first coordinate of the third interpolation point, B, C, and D are constants, and optionally, B, C, and D may be carried in the dynamic metadata; calculating a second coordinate VA1 of the first interpolation point on the first spline curve based on TH1 and MB0; calculating a second coordinate VA3 of the third interpolation point on the initial tone mapping curve based on TH3; calculating a second coordinate VA2 of the second interpolation point on a first straight line based on TH2, where the first straight line is a straight line on which the first interpolation point and the third interpolation point are located; calculating a first-order derivative GD3 of the initial tone mapping curve at the third interpolation point based on TH3; determining VA1 as a first coefficient MA1 of the second spline curve; determining MB0 as a second coefficient MB1 of the second spline curve; determining a sum of VA2 and an offset value as a first coefficient MA2 of the third spline curve, where the offset value is 0, a positive number, or a negative number; constructing, based on TH1, TH2, TH3, VA2, VA3, GD3, and a derivative relationship between the second spline curve and the third spline curve at the second interpolation point, a system of equations that includes five equations; and solving the system of equations that includes five equations, to obtain MC1, MD1, MB2, MC2, and MD2.

The first obtaining process corresponds to a case in which an overall scene of an image is dark. In this case, a dark region is modified, to better display a dark-region detail of the image, so that a pixel whose luminance is lower than a display capability of a display device can have a good display effect on the display device. Specifically, tone mapping is performed, based on a linear spline function formula, on pixels that are lower than a first threshold (TH1), so that dark-region detail information of the part is better reserved. Then, a smooth transition between the linear spline function and the initial tone mapping curve is implemented based on a cubic spline function, to prevent an unsmooth tone mapping curve from affecting a tone mapping effect. It should be understood that in this embodiment of this application, there are two cubic spline curves. In an optional case, there may be only one cubic spline curve, and the first spline curve is smoothly connected to the initial tone mapping curve by using one cubic spline function. In this case, only two interpolation points need to be determined.

The first spline curve increases dark-region luminance compared with a base curve. This is equivalent to allocating more bits to the dark region. The two cubic spline functions implement a smooth transition between the first spline curve and the initial tone mapping curve, and enhancement or weakening processing may be performed on a modified region by controlling a point on and a slope of the curve.

In a possible implementation, the modified spline curve obtained in the second obtaining process includes a first spline curve and a second spline curve, the first spline curve is a cubic spline curve that passes through a first interpolation point and a second interpolation point, the second spline curve is a cubic spline curve that passes through the second interpolation point and a third interpolation point, and the invoking a second obtaining process includes: obtaining a first coordinate TH1 of the first interpolation point, a first coordinate TH2 of the second interpolation point, and a first coordinate TH3 of the third interpolation point based on the dynamic metadata; respectively calculating second coordinates VA1 and VA3 of the first interpolation point and the third interpolation point on the initial tone mapping curve based on TH1 and TH3; calculating a second coordinate VA2 of the second interpolation point on a first straight line based on TH2, where the first straight line is a straight line on which the first interpolation point and the third interpolation point are located; calculating a first-order derivative GD1 of the initial tone mapping curve at the first interpolation point and a first-order derivative GD3 of the initial tone mapping curve at the third interpolation point; determining VA1 as a first coefficient MA1 of the first spline curve; determining GD1 as a second coefficient MB1 of the first spline curve; determining a sum of VA2 and an offset value as a first coefficient MA2 of the second spline curve, where the offset value is 0, a positive number, or a negative number; constructing, based on TH1, TH2, TH3, VA2, VA3, GD3, and a derivative relationship between the first spline curve and the second spline curve at the second interpolation point, a system of equations that includes five equations; and solving the system of equations that includes five equations, to obtain MC1, MD1, MB2, MC2, and MD2.

The second obtaining process corresponds to a case in which an image includes a pixel located in a specific luminance range. In this case, the specific luminance range is mainly modified, to better display a luminance detail of the image in the range. Specifically, tone mapping is performed on a pixel between the first interpolation point and the second interpolation point and a pixel between the second interpolation point and the third interpolation point based on a cubic spline function, to improve a display effect of the part of pixels. Further, a smooth transition exists between the first spline curve and the second spline curve and between the initial tone mapping curve and each of the first spline curve and the second spline curve, to prevent an unsmooth tone mapping curve from affecting a tone mapping effect.

Specifically, in this modification manner, any range may be modified. In addition, a modified curve of the modified range is smoothly connected to the initial tone mapping curve, and an interpolation point and an offset value may be controlled to increase image contrast or increase or decrease luminance values of a part of pixels, to achieve a desired effect.

In a possible implementation, the modified spline curve obtained in the third obtaining process includes a first spline curve, the first spline curve is a linear spline curve that passes through a first interpolation point, and the invoking a third obtaining process includes: obtaining a first coordinate TH1 of the first interpolation point based on the dynamic metadata; determining a second coordinate VA1 of the first interpolation point on the initial tone mapping curve and a first-order derivative GD1 of the initial tone mapping curve at the first interpolation point based on TH1; determining GD1 as a second coefficient MB0 of the first spline curve; and determining VA1 as a first coefficient MA0 of the first spline curve.

The third obtaining process corresponds to a case in which an overall scene of an image is bright. In this case, a bright region is modified, to better display a bright-region detail of the image. Specifically, tone mapping is performed, based on a linear function, on a pixel region that is greater than a preset threshold (TH1), and the first spline curve is smoothly connected to the initial tone mapping curve at the first interpolation point, to prevent an unsmooth tone mapping curve from affecting a tone mapping effect.

Specifically, when tone mapping is performed, by using a linear spline curve, on a pixel whose value is greater than the first interpolation of the first interpolation point, it indicates that all pixels whose value is greater than TH1 are compressed by using a compression rate of the first interpolation point, to avoid excessive compression of a bright-region pixel, and improve an image luminance value.

In a possible implementation, the modified spline curve obtained in the fourth obtaining process includes a first spline curve, the first spline curve is a cubic spline curve that passes through a first interpolation point and a second interpolation point, and the invoking a fourth obtaining process includes: obtaining a first coordinate TH1 of the first interpolation point and a first coordinate TH2 of the second interpolation point based on the dynamic metadata; respectively calculating second coordinates VA1 and VA2 of the first interpolation point and the second interpolation point on the initial tone mapping curve based on TH1 and TH2; calculating a first-order derivative GD1 of the initial tone mapping curve at the first interpolation point and a first-order derivative GD2 of the initial tone mapping curve at the second interpolation point based on TH1 and TH2; enabling a second coordinate of the second interpolation point on the first spline curve to be a sum of VA2 and S1, to obtain a first equation, where S1 is a coordinate offset value included in the dynamic metadata; enabling a first-order derivative of the first spline curve at the second interpolation point to be a sum of GD2 and S2, to obtain a second equation, where S2 is a slope offset value included in the dynamic metadata; and solving a system of equations that includes the first equation and the second equation, to obtain a third coefficient MC1 and a fourth coefficient MD1 of the first spline curve.

The fourth obtaining process corresponds to a case in which an overall scene of an image is bright. In this case, a bright region is modified, to better display a bright-region detail of the image. Specifically, tone mapping is performed on a pixel region between the first interpolation point and the second interpolation point based on a cubic spline function, and the cubic spline function is smoothly connected to the initial tone mapping curve at the first interpolation point, to prevent an unsmooth tone mapping curve from affecting a tone mapping effect.

Specifically, a luminance value of a pixel between the first interpolation point and a bright-region pixel endpoint may be increased, or a luminance value of a pixel between the first interpolation point and a bright-region pixel endpoint may be decreased. This may achieve a more dazzling effect by increasing luminance, and may enhance the bright-region detail by decreasing luminance. In addition, the increase and the decrease are nonlinear processes, so that contrast can be increased.

In a possible implementation, the modified spline curve obtained in the fifth obtaining process includes a first spline curve and a second spline curve, the first spline curve is a cubic spline curve that passes through a first interpolation point and a second interpolation point, the second spline curve is a linear spline curve that passes through the second interpolation point and a third interpolation point, and the invoking a fifth obtaining process includes: obtaining a first coordinate TH1 of the first interpolation point, a first coordinate TH2 of the second interpolation point, and a first coordinate TH3 of the third interpolation point based on the dynamic metadata; respectively calculating second coordinates VA1 and VA3 of the first interpolation point and the third interpolation point on the initial tone mapping curve based on TH1 and TH3; calculating a second coordinate VA2 of the second interpolation point on a first straight line based on TH2, where the first straight line is a straight line on which the first interpolation point and the third interpolation point are located; calculating a first-order derivative GD1 of the initial tone mapping curve at the first interpolation point; determining VA1 as a first coefficient MA1 of the first spline curve; determining GD1 as a second coefficient MB1 of the first spline curve; determining, as a first coefficient MA2 of the second spline curve, a sum of VA2 and a coordinate offset value included in the dynamic metadata; constructing, based on TH1, TH2, TH3, VA2, VA3, and a derivative relationship between the first spline curve and the second spline curve at the second interpolation point, a system of equations that includes three equations; and solving the system of equations that includes three equations, to obtain MC1, MD1, and MB2.

In an optional case, a luminance value of the first interpolation point is greater than a luminance value of the second interpolation point, and the luminance value of the second interpolation point is greater than a luminance value of the third interpolation point.

In an optional case, a luminance value of the first interpolation point is less than a luminance value of the second interpolation point, and the luminance value of the second interpolation point is less than a luminance value of the third interpolation point.

The fifth obtaining process corresponds to a case in which an overall scene of an image is bright. In this case, a bright region is modified, to better display a bright-region detail of the image. Specifically, tone mapping is performed on a pixel region between the second interpolation point and the third interpolation point based on a linear spline curve, and a linear spline function is smoothly connected to the initial tone mapping curve based on a cubic spline function between the first interpolation point and the second interpolation point, to prevent an unsmooth tone mapping curve from affecting a tone mapping effect.

Specifically, in this scenario, a cubic spline function may be used between the first interpolation point and the second interpolation point to increase luminance and decrease luminance for the initial tone mapping curve, and the increase and the decrease are nonlinear. Tone mapping is performed between the second interpolation point and the third interpolation point based on a straight line, so that more bits can be allocated to a pixel between the second interpolation point and the third interpolation point, to enhance the bright-region detail.

In a possible implementation, the initial tone mapping curve includes one of the following formulas:

$$L' = a \times \left(\frac{p \times L}{(p-1) \times L + 1}\right)^m + b;$$

$$L' = a \times L + b;$$

$$L' = \frac{c_1 + c_2 \times L^n}{1 + c_3 \times L^n};$$

$$L' = \sum_{p=0}^{N} \binom{N}{p} \times L^p \times (1-L)^{N-p} \times P_p,$$

where L represents a linear signal value, L' represents a non-linear signal value, p, a, m, b, $c_1$, $c_2$, $c_3$, n, N, and p are all dynamic range mapping coefficients, and $0 \leq L \leq 1$.

According to a third aspect, this application provides an image processing apparatus, including a module configured to perform the method according to any one of the first aspect or the possible implementations of the first aspect.

According to a fourth aspect, this application provides an image processing apparatus, including: a determining module, configured to determine a mode indication value in dynamic metadata, where the mode indication value is used to indicate a target scene mode applicable to a to-be-processed image, where the determining module is further configured to: invoke, based on the mode indication value, an obtaining process of a parameter that is of a modified spline curve and that corresponds to the target scene mode, and obtain the modified spline curve; and a tone mapping module, configured to perform tone mapping on the to-be-processed image based on a modified tone mapping curve, where the modified tone mapping curve includes at least a part of an initial tone mapping curve and the modified spline curve.

In a possible implementation, the determining module is specifically configured to: when the mode indication value is a first preset value, invoke a first obtaining process; when the mode indication value is a second preset value, invoke a second obtaining process; when the mode indication value is a third preset value, invoke a third obtaining process; when the mode indication value is a fourth preset value, invoke a fourth obtaining process; or when the mode indication value is a fifth preset value, invoke a fifth obtaining process.

In a possible implementation, the modified spline curve obtained in the first obtaining process includes a first spline curve, a second spline curve, and a third spline curve, the first spline curve is a linear spline function that passes through an origin and a first interpolation point, the second spline curve is a cubic spline curve that passes through the first interpolation point and a second interpolation point, the third spline curve is a cubic spline curve that passes through the second interpolation point and a third interpolation point, and the determining module is specifically configured to: determine a first coordinate TH1 of the first interpolation point based on at least one of a maximum luminance value maxL of the to-be-processed image and an average luminance value avgL of the to-be-processed image that are included in the dynamic metadata; obtain a first-order derivative MB0 of the first spline curve based on the at least one of the maximum luminance value maxL of the to-be-processed image and the average luminance value avgL of the to-be-processed image that are included in the dynamic metadata; TH2=TH1+B; TH3=TH2+C*TH2−D*CH2, where TH2 is a first coordinate of the second interpolation point, TH3 is a first coordinate of the third interpolation point, B, C, and D are constants, and optionally, B, C, and D are constants included in the dynamic metadata; calculate a second coordinate VA1 of the first interpolation point on the first spline curve based on TH1 and MB0; calculate a second coordinate VA3 of the third interpolation point on the initial tone mapping curve based on TH3; calculate a second coordinate VA2 of the second interpolation point on a first straight line based on TH2, where the first straight line is a straight line on which the first interpolation point and the third interpolation point are located; calculate a first-order derivative GD3 of the initial tone mapping curve at the third interpolation point based on TH3; determine VA1 as a first coefficient MA1 of the second spline curve; determine MB0 as a second coefficient MB1 of the second spline curve; determine a sum of VA2 and an offset value as a first coefficient MA2 of the third spline curve, where the offset value is 0, a positive number, or a negative number; construct, based on TH1, TH2, TH3, VA2, VA3, GD3, and a derivative relationship between the second spline curve and the third spline curve at the second interpolation point, a system of equations that includes five equations; and solve the system of equations that includes five equations, to obtain MC1, MD1, MB2, MC2, and MD2.

In a possible implementation, the modified spline curve obtained in the second obtaining process includes a first spline curve and a second spline curve, the first spline curve is a cubic spline curve that passes through a first interpolation point and a second interpolation point, the second spline curve is a cubic spline curve that passes through the second interpolation point and a third interpolation point, and the determining module is specifically configured to: obtain a first coordinate TH1 of the first interpolation point, a first coordinate TH2 of the second interpolation point, and a first coordinate TH3 of the third interpolation point based on the dynamic metadata; respectively calculate second coordinates VA1 and VA3 of the first interpolation point and the third interpolation point on the initial tone mapping curve based on TH1 and TH3; calculate a second coordinate VA2 of the second interpolation point on a first straight line based on TH2, where the first straight line is a straight line on which the first interpolation point and the third interpolation point are located; calculate a first-order derivative GD1 of the initial tone mapping curve at the first interpolation point and a first-order derivative GD3 of the initial tone mapping curve at the third interpolation point; determine VA1 as a first coefficient MA1 of the first spline curve; determine GD1 as a second coefficient MB1 of the first spline curve; determine a sum of VA2 and an offset value as a first coefficient MA2 of the second spline curve, where the offset value is 0, a positive number, or a negative number; construct, based on TH1, TH2, TH3, VA2, VA3, GD3, and a derivative relationship between the first spline curve and the second spline curve at the second interpolation point, a system of equations that includes five equations; and solve the system of equations that includes five equations, to obtain MC1, MD1, MB2, MC2, and MD2.

In a possible implementation, the modified spline curve obtained in the third obtaining process includes a first spline curve, the first spline curve is a linear spline curve that passes through a first interpolation point, and the determining module is specifically configured to: obtain a first coordinate TH1 of the first interpolation point based on the dynamic metadata; determine a second coordinate VA1 of the first interpolation point on the initial tone mapping curve and a first-order derivative GD1 of the initial tone mapping curve at the first interpolation point based on TH1; determine GD1 as a second coefficient MB0 of the first spline curve; and determine VA1 as a first coefficient MA0 of the first spline curve.

In a possible implementation, the modified spline curve obtained in the fourth obtaining process includes a first spline curve, the first spline curve is a cubic spline curve that passes through a first interpolation point and a second interpolation point, and the determining module is specifically configured to: obtain a first coordinate TH1 of the first interpolation point and a first coordinate TH2 of the second interpolation point based on the dynamic metadata; respectively calculate second coordinates VA1 and VA2 of the first interpolation point and the second interpolation point on the initial tone mapping curve based on TH1 and TH2; calculate a first-order derivative GD1 of the initial tone mapping curve at the first interpolation point and a first-order derivative GD2 of the initial tone mapping curve at the second interpolation point based on TH1 and TH2; enable a second coordinate of the second interpolation point on the first spline curve to be a sum of VA2 and S1, to obtain a first equation, where S1 is a coordinate offset value included in the dynamic metadata; enable a first-order derivative of the first spline curve at the second interpolation point to be a sum of GD2 and S2, to obtain a second equation, where S2 is a slope offset value included in the dynamic metadata; and solve a system of equations that includes the first equation and the second equation, to obtain a third coefficient MC1 and a fourth coefficient MD1 of the first spline curve.

In a possible implementation, the modified spline curve obtained in the fifth obtaining process includes a first spline curve and a second spline curve, the first spline curve is a cubic spline curve that passes through a first interpolation point and a second interpolation point, the second spline curve is a linear spline curve that passes through the second interpolation point and a third interpolation point, and the determining module is specifically configured to: obtain a first coordinate TH1 of the first interpolation point, a first coordinate TH2 of the second interpolation point, and a first coordinate TH3 of the third interpolation point based on the dynamic metadata; respectively calculate second coordinates VA1 and VA3 of the first interpolation point and the third interpolation point on the initial tone mapping curve based on TH1 and TH3; calculate a second coordinate VA2 of the second interpolation point on a first straight line based on TH2, where the first straight line is a straight line on which the first interpolation point and the third interpolation point are located; calculate a first-order derivative GD1 of the initial tone mapping curve at the first interpolation point; determine VA1 as a first coefficient MA1 of the first spline curve; determine GD1 as a second coefficient MB1 of the first spline curve; determine a sum of VA2 and an offset value as a first coefficient MA2 of the second spline curve, where the offset value is 0, a positive number, or a negative number; construct, based on TH1, TH2, TH3, VA2, VA3, and a derivative relationship between the first spline curve and the second spline curve at the second interpolation point, a system of equations that includes three equations; and solve the system of equations that includes three equations, to obtain MC1, MD1, and MB2.

According to a fifth aspect, this application provides an image processing apparatus, including a processor and a transmission interface. The transmission interface is configured to receive or send image data. The processor is configured to: invoke program instructions stored in a memory, and execute the program instructions to perform the method according to any one of the first aspect or the implementations of the first aspect.

For example, the image processing apparatus may be a chip.

According to a sixth aspect, this application provides an image processing apparatus, including a processor and a transmission interface. The transmission interface is configured to receive or send image data. The processor is configured to: invoke program instructions stored in a memory, and execute the program instructions to perform the method according to any one of the first aspect or the possible implementations of the first aspect.

In a possible implementation, the image processing apparatus may further include a memory.

According to a seventh aspect, this application provides an image processing apparatus, including a processor and a transmission interface. The transmission interface is configured to receive or send image data. The processor is configured to: invoke program instructions stored in a memory, and execute the program instructions to perform the method according to any one of the second aspect or the possible implementations of the second aspect.

According to an eighth aspect, this application provides an image processing apparatus, including a processor and a memory, and configured to perform the method according to any one of the first aspect or the implementations of the first aspect.

According to a ninth aspect, this application provides an image processing apparatus, including a processor and a memory, and configured to perform the method according to any one of the second aspect or the implementations of the second aspect.

According to a tenth aspect, this application provides a computer-readable storage medium. The computer-readable storage medium stores program instructions, and when the program instructions are run on a computer or a processor, the computer or the processor is enabled to perform the method according to any one of the first aspect or the implementations of the first aspect.

According to an eleventh aspect, this application provides a computer-readable storage medium. The computer-readable storage medium stores program instructions, and when the program instructions are run on a computer or a processor, the computer or the processor is enabled to perform the method according to any one of the second aspect or the implementations of the second aspect.

According to a twelfth aspect, this application provides a computer program product, including a computer program. When the computer program is executed on a computer or a processor, the computer or the processor is enabled to perform the method according to any one of the first aspect or the implementations of the first aspect.

According to a thirteenth aspect, this application provides a computer program product, including a computer program. When the computer program is executed on a computer or a processor, the computer or the processor is enabled to perform the method according to any one of the second aspect or the implementations of the second aspect.

BRIEF DESCRIPTION OF DRAWINGS

FIG. 10 is a flowchart of an exemplary method for obtaining a parameter of a modified spline curve according to an embodiment of this application.

DESCRIPTION OF EMBODIMENTS

Figure 1:
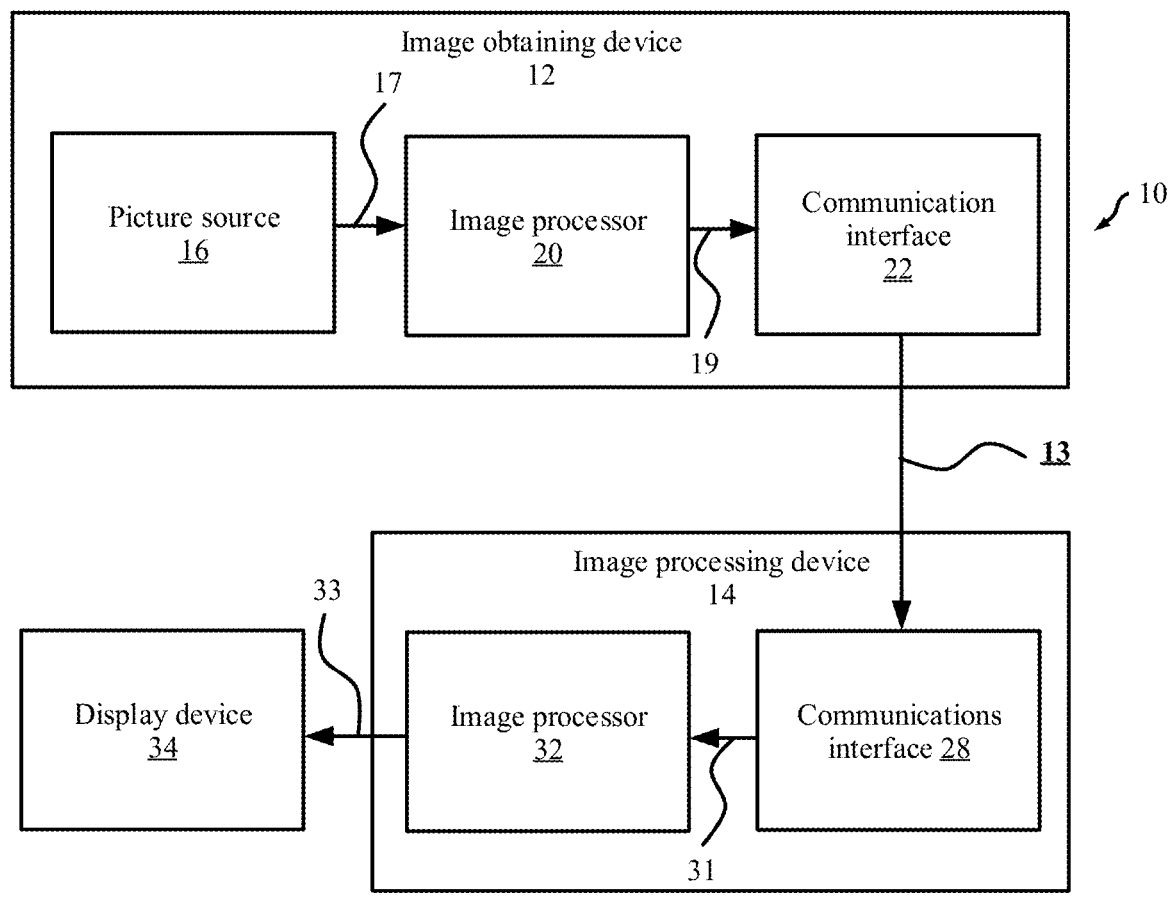
FIG. 1 is a schematic block diagram of an image display system according to an embodiment of this application.

In the specification, claims, and accompanying drawings of this application, the terms "first", "second", and the like are intended to distinguish between similar objects but do not necessarily indicate a specific order or sequence. Moreover, the terms "include", "have", and any other variant thereof are intended to cover a non-exclusive inclusion, for example, including a series of steps or units. Methods, systems, products, or devices are not necessarily limited to those expressly listed steps or units, but may include other steps or units that are not expressly listed or that are inherent to such processes, methods, products, or devices.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following" or similar expressions indicate any combination of the following, including one or any combination of two or more of the following. For example, at least one of a, b, or c may indicate: a, b, c, "a and b", "a and c", "b and c", or "a, b and c", where there may one or more a-s, one or more b-s, and one or more c-s.

An image obtaining device may generate, by receiving an optical signal in a natural scene, a picture or a video that includes the natural scene. To facilitate image or video transmission, the optical signal needs to be converted into an electrical signal, and image information of each pixel is recorded by using a luminance value or a chrominance value (for example, a grayscale value is between 0 and 255) in a fixed value range. A curve for converting the optical signal into the electrical signal is an optical-electro transfer function. Common optical-electro transfer functions include a PQ (perceptual quantizer) optical-electro transfer function, an HLG (hybrid log-gamma) optical-electro transfer function, and a scene luminance fidelity (SLF) optical-electro transfer function. A display device may reproduce the natural scene by displaying the picture or the video. In an optional case, the image obtaining device is referred to as a front-end device, and the display device is referred to as a back-end device. The display device may determine, based on the optical-electro transfer function and a luminance value or a grayscale value of each pixel in an image, luminance that is of an object and that exists during photographing, that is, an electronic device may convert YUV or RGB information into luminance in a unit of nit. However, luminance of the object may exceed a display capability of the display device. Because luminance information obtained by the image obtaining device does not match a luminance display capability of the display device, the following cases exist: A display device with a low luminance display capability displays a high-luminance image, and a display device with a high luminance display capability displays a low-luminance image. In these cases, tone mapping needs to be performed on the image obtained by the image obtaining device, so that the image matches the display capability of the display device. For example, tone mapping may be performed on a high dynamic range image based on a tone mapping curve, to display the image on a display device with a low dynamic range display capability. It should be understood that the tone mapping curve may be determined by the display device, or may be determined by a processing device disposed outside the display device.

However, in some cases, when the tone mapping curve is not accurate, a display effect of the high dynamic range image is poor. For example, in a process of playing a video, if only one tone mapping curve is determined for the video, a difference between image content displayed in different video frames may be large. For example, images displayed in some video frames are very dark, and images displayed in some other video frames are very bright. If a fixed tone mapping curve is used for the entire video, no frame of picture in the video can be perfectly reproduced on the display device. In addition, the tone mapping curve carries a large amount data. If a tone mapping curve is determined for each image or picture frame, a data redundancy result may be caused.

This application provides an image processing method and apparatus, to flexibly modify an initial tone mapping curve based on a scene feature, so that a good display effect or a display effect that meets a subjective requirement can be obtained, in different scenes, for an image on which tone mapping is performed.

FIG. 1 is a schematic block diagram of an exemplary image display system 10 according to an embodiment of this application. The image display system 10 may include an image obtaining device 12, an image processing device 14, and a display device 34. For example, the image obtaining device 12 may obtain an HDR image or a standard dynamic range (SDR) image. The image processing device 14 may process the HDR image or the SDR image obtained by the image obtaining device 12.

The image obtaining device 12 and the image processing device 14 may be communicatively connected by using a link 13, and the image processing device 14 may receive image data from the image obtaining device 12 by using the link 13. The link 13 may include one or more communication media or apparatuses. The one or more communication media may include a wireless communication medium and/or a wired communication medium, such as a radio frequency (RF) spectrum or one or more physical transmission lines. Optionally, the one or more communication media may form a part of a packet-based network, and the packet-based network may be, for example, a local area network, a wide area network, or a global network (for example, the Internet). The one or more communication media may include a router, a switch, a base station, or another device that facilitates communication from the image obtaining device 12 to the image processing device 14. In an optional case, the link 13 may be a Bluetooth wireless link.

For example, the image obtaining device 12 includes a picture source 16 and a communication interface 22 that may be alternatively referred to as a transmission interface. In addition, optionally, the image obtaining device 12 may further include an image processor 20. In a specific implementation, the image processor 20, the picture source 16, and the communication interface 22 may be hardware components in the image obtaining device 12, or may be software programs in the image obtaining device 12, or the communication interface 22 may be a combination of a hardware module and a software program.

The picture source 16 may include or be any type of picture capturing device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). For example, the picture source 16 may be a camera used to capture a picture or a memory configured to store a picture. The picture source 16 may further include any type of (internal or external) interface that stores a previously captured or generated picture and/or obtains or receives a picture. When the picture source 16 is a camera, the picture source 16 may be, for example, a local camera or an integrated camera integrated into the image obtaining device. When the picture source 16 is a memory, the picture source 16 may be a local memory, or may be, for example, an integrated memory integrated into the image obtaining device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server.

The picture may be considered as a two-dimensional array or matrix of pixels. The pixel in the array may also be referred to as a sample. In an optional case, to represent a color, each pixel includes three color components. For example, in an RGB format or color space, a picture includes corresponding red, green, and blue sample arrays. However, in video coding, each pixel is usually represented in a luminance/chrominance format or color space, for example, a picture in a YUV format includes a luminance component indicated by Y (sometimes indicated by L alternatively) and two chrominance components indicated by U and V. The luminance (luma) component Y represents luminance or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). A picture in an RGB format may be converted into a picture in a YUV format, and vice versa. This process is also referred to as color conversion or color format conversion. If a picture is monochrome, the picture may include only a luminance sample array. In this embodiment of this application, a picture transmitted by the picture source 16 to the picture processor may also be referred to as raw picture data 17.

The image processor 20 is configured to perform image processing, for example, luminance mapping, tone mapping, color format conversion (for example, conversion from the RGB format to the YUV format), color gamut conversion, saturation adjustment, color adjustment, resolution adjustment, or denoising.

The communication interface 22 may be configured to receive picture data 19 obtained through image processing, and may transmit, by using the link 13 to the image processing device 14 for further image processing or to a memory for storage, the picture data 19 obtained through image processing. For example, the communication interface 22 may be configured to encapsulate the picture data 19, obtained through image processing, into a proper format such as a data packet for transmission on the link 13.

The image processing device 14 includes a communication interface 28, an image processor 32, and the display device 34. They are separately described as follows:

The communication interface 28 may be configured to receive, from the image obtaining device 12 or any other source, the picture data 19 obtained through image processing. The any other source is, for example, a storage device.

For example, for specific examples of the communication interface 22 and the communication interface 28, refer to the foregoing descriptions of the interface. Details are not described herein again. The communication interface 28 may be configured to transmit or receive, by using the link 13 between the image obtaining device 12 and the image processing device 14 or any other type of network, the picture data 19 obtained through image processing. The communication interface 28 may be configured to, for example, decapsulate a data packet transmitted by the communication interface 22, to obtain the picture data 19 obtained through image processing.

Both the communication interface 28 and the communication interface 22 may be configured as a unidirectional communication interface or a bidirectional communication interface, and may be configured to, for example, send and receive a message to establish a connection, acknowledge and exchange any other information related to a communication link, and/or, for example, picture data obtained through image processing, and/or data transmission. For example, the communication interface 28 and the communication interface 22 may be any type of interface based on any dedicated or standardized interface protocol, for example, a high definition multimedia interface (HDMI), a mobile industry processor interface (MIPI), a display serial interface (DSI) standardized by MIPI, an embedded display port (eDP), a display port (DP), or a V-By-One interface that is standardized by a video electronics standards association (VESA), where the V-By-One interface is a digital interface standard developed for image transmission, and various wired or wireless interfaces and optical interfaces.

The image processor 32 is configured to perform tone mapping processing on the picture data 19 obtained through image processing, to obtain picture data 33 obtained through tone mapping. Processing performed by the image processor 32 may further include processing such as conversion into super-resolution, color format conversion (for example, conversion from the YUV format to the RGB format), denoising, color gamut conversion, saturation adjustment, luminance mapping, upsampling, downsampling, and image sharpening, and the image processor 32 may be further configured to transmit, to the display device 34, the picture data 33 obtained through tone mapping. It should be understood that the image processor 20 and the image processor 32 each may be a general central processing unit (CPU), a system on chip (SOC), a processor integrated into the SOC, an independent processor chip or controller, or the like. Alternatively, the image processor 20 and the image processor 32 each may be a dedicated processing device, for example, an application-specific integrated circuit (ASIC), a field programmable gate array (FPGA) or a digital signal processor (DSP), a dedicated video or graphics processor, a graphics processing unit (GPU), and a neural-network processing unit (NPU). The image processor 20 and the image processor 32 each may be a processor group including a plurality of processors, and the plurality of processors are coupled to each other by using one or more buses.

The display device 34 is configured to receive the picture data 33 obtained through tone mapping processing, to display a picture to a user or a viewer. The display device 34 may be or include any type of display configured to present a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays. In an optional case, the display device 34 has an image processing function, and the display device may perform tone mapping on an image.

It should be understood that, in FIG. 1, the image obtaining device 12, the image processing device 14, and the display device 34 are drawn as separate devices. In an optional case, an image processing apparatus may have functions of both the image obtaining device 12 and the image processing device 14. In an optional case, an image processing apparatus may have functions of both the image processing device 14 and the display device 34. In an optional case, an image processing apparatus has functions of the image obtaining device 12, the image processing device 14, and the display device 34. For example, a smartphone has a camera, an image processor, and a display screen, the camera corresponds to the image obtaining device 12, corresponds to the display device 34. For another example, a smart television has a camera, an image processor, and a display screen, the camera corresponds to the image obtaining device 12, the image processor corresponds to the image processing device 14, and the display screen corresponds to the display device 34.

In an optional case, the image processing device includes a hardware layer, an operating system layer that runs above the hardware layer, and an application layer that runs above the operating system layer. The hardware layer includes hardware such as a CPU, a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, in this embodiment of this application, no particular limitation is imposed on a specific structure of an execution body of the method provided in embodiments of this application, provided that related code can be run to implement the method provided in the embodiment of this application to perform image processing. For example, the method provided in embodiments of this application may be performed by an electronic device, or may be performed by a functional module that is in the electronic device and that can invoke a program and execute the program, for example, may be a processor in the electronic device.

It should be understood that the image obtaining device 12 and the image processing device 14 may include any type of handheld or still device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content server or a content distribution server), a broadcast receiver device, and a broadcast transmitter device, and may not use or may use any type of operating system.

Figure 2:
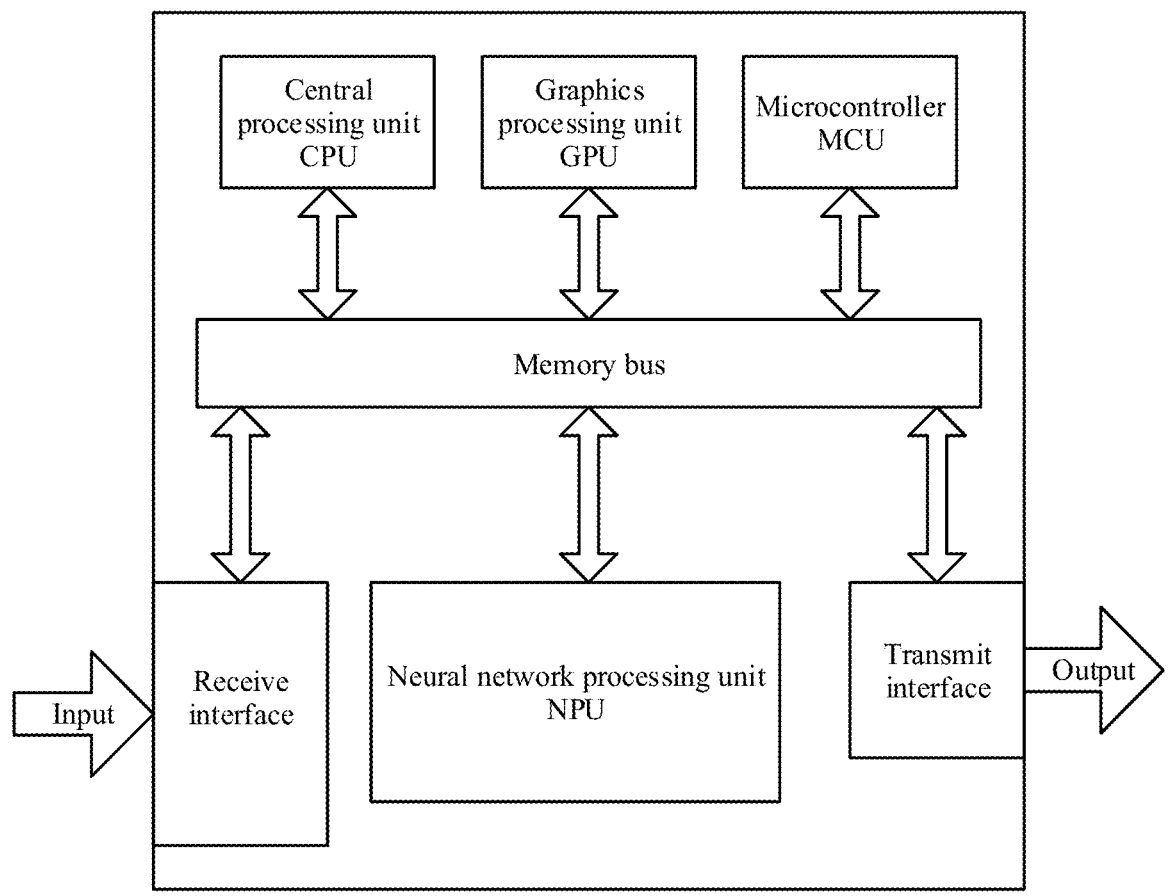
FIG. 2 is a diagram of a hardware architecture of an exemplary image processing apparatus according to an embodiment of this application.

FIG. 2 is a diagram of a hardware architecture of an exemplary image processing apparatus according to an embodiment of this application. An image processing apparatus 200 may be, for example, a processor chip. For example, the diagram of the hardware architecture shown in FIG. 2 may be an example architecture diagram of the image processor 20 or the image processor 32 in FIG. 1. The image processing method provided in embodiments of this application may be applied to the processor chip.

Referring to FIG. 2, the apparatus 200 includes: at least one CPU, a microcontroller unit (MCU), a GPU, an NPU, a memory bus, a receive interface, a transmit interface, and the like. Although not shown in FIG. 2, the apparatus 200 may further include an application processor (AP), a memory, a decoder, and a dedicated video or image processor. The foregoing parts of the apparatus 200 are coupled to each other by using a connector. For example, the connector includes various interfaces, transmission lines, or buses. These interfaces are generally electrical communication interfaces, but may alternatively be mechanical interfaces or other forms of interfaces. This is not limited in this embodiment.

Optionally, the CPU may be a single-core processor (single-CPU) or a multi-core processor (multi-CPU). Optionally, the CPU may be a processor group including a plurality of processors, and the plurality of processors are coupled to each other by using one or more buses. The receive interface may be a data input interface of a processor chip. In an optional case, for types of the receive interface and the transmit interface, refer to the descriptions in the parts of the communication interface 28 and the communication interface 22. Details are not described herein again.

The memory is coupled to the CPU, the GPU, the MCU, the NPU, and the like by using the memory bus. The memory may be configured to store computer program instructions, including a computer operating system (OS) and various user application programs. The memory is further configured to store image data or video data. Optionally, the memory may be a nonvolatile memory, for example, an embedded multimedia card (EMMC), a universal flash storage (UFS), or a read-only memory (ROM); or may be another type of static storage device that can store static information and an instruction; or may be a volatile memory, for example, a random access memory (RAM), or another type of dynamic storage device that can store information and an instruction; or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other computer-readable storage medium that can be configured to carry or store program code in a form of an instruction or a data structure and can be accessed by a computer. However, the memory is not limited thereto. It should be understood that the memory may be independent of the image processing apparatus 200.

In an optional case, the foregoing parts are integrated into a same chip. In another optional case, the CPU, the GPU, the decoder, the receiving interface, and the sending interface are integrated into a chip, and each part in the chip accesses an external memory by using a bus. The dedicated video/graphics processor may be integrated into a same chip as the CPU, or may be used as a separate processor chip. For example, the dedicated video/graphics processor may be a dedicated ISP. In an optional case, the NPU may also be used as a separate processor chip. The NPU is configured to implement related operations of various neural networks or deep learning. Optionally, the image processing method and the image processing framework that are provided in embodiments of this application may be implemented by the GPU or the NPU, or may be implemented by a dedicated graphics processor.

A chip in embodiments of this application is a system manufactured on a same semiconductor substrate by using an integrated circuit technology, and is also referred to as a semiconductor chip. The chip may be a set of integrated circuits formed on the substrate (which is usually a semiconductor material such as silicon) by using the integrated circuit technology, and an outer layer of the chip is usually packaged with a semiconductor packaging material. The integrated circuit may include various functional components. Each type of functional component includes a logic gate circuit, a metal oxide semiconductor (MOS) transistor, or a transistor such as a bipolar transistor or a diode, and may also include another part such as a capacitor, a resistor, or an inductor. Each functional component may independently operate or operate under action of necessary driver software, and may implement various functions such as communication, operation, or storage.

Figure 3:
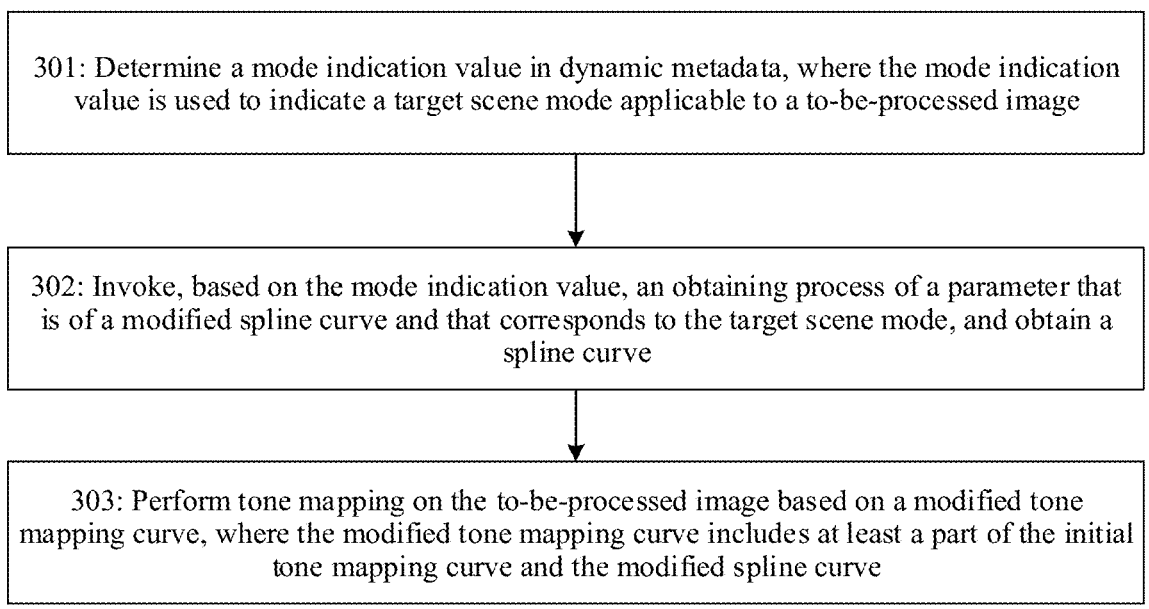
FIG. 3 is a schematic flowchart of an exemplary image processing method according to an embodiment of this application.

FIG. 3 is a schematic flowchart of an image processing method according to an embodiment of this application. It should be understood that, for ease of description, FIG. 3 describes the method by using steps. The method flowchart, that is, FIG. 3 shows a sequence of the method, but in some cases, the described steps can be performed in a sequence different from the sequence herein.

The image processing method includes the following steps:

301. Determine a mode indication value in dynamic metadata, where the mode indication value is used to indicate a target scene mode applicable to a to-be-processed image.

It should be understood that the dynamic metadata is generated when a video front-end device generates image data or video data, and the dynamic metadata includes the mode indication value. For example, the mode indication value may be obtained by the front-end device by analyzing obtained or generated image data. The video front-end device may be the image obtaining device 12 shown in FIG. 1. For example, when obtaining or generating the image data, the image obtaining device 12 performs image frame analysis on each frame of image data to obtain feature information of the frame of image data. Further, a tone mapping mode applicable to the image data may be determined based on the feature information obtained through analysis. For example, if an overall scene of a current image is dark, it is determined that the image frame is applicable to a dark-scene tone mapping mode. If an overall scene of a current image is bright, it is determined that the image frame is applicable to a bright-scene tone mapping mode. If a current image includes a pixel located in a specific luminance range, it is determined that the image frame is applicable to a specific-scene tone mapping mode. Further, after receiving the to-be-processed image and the dynamic metadata of the to-be-processed image, an image processing device 14 or a display device 34 adaptively modifies an initial tone mapping curve based on the mode indication value in the dynamic metadata, and performs tone mapping on the to-be-processed image based on the modified tone mapping curve. In an optional case, a set-top box may be referred to as a play device. It should be understood that step 301 may be performed by the image processing device 14 or the display device 34 shown in FIG. 1. For example, the image processing device 14 may be a set-top box or an image processor in the set-top box, or may be an image processor or an image processing unit in a smart mobile terminal that has a play and display capability.

302. Invoke, based on the mode indication value, an obtaining process of a parameter that is of a modified spline curve and that corresponds to the target scene mode, and obtain the spline curve.

Details are as follows:

When the mode indication value is a first preset value, a first obtaining process is invoked.

When the mode indication value is a second preset value, a second obtaining process is invoked.

When the mode indication value is a third preset value, a third obtaining process is invoked.

When the mode indication value is a fourth preset value, a fourth obtaining process is invoked.

When the mode indication value is a fifth preset value, a fifth obtaining process is invoked.

For example, the mode indication value included in the dynamic metadata is set to 3Spline_num.

If 3Spline_num is equal to 0, a spline curve parameter obtaining process 0 is invoked, and a parameter that is of the modified spline curve and that corresponds to a first scene mode is obtained.

If 3Spline_num is equal to 1, a spline curve parameter obtaining process 1 is invoked, and a parameter that is of the modified spline curve and that corresponds to a second scene mode is obtained.

If 3Spline_num is equal to 2, a spline curve parameter obtaining process 2 is invoked, and a parameter that is of the modified spline curve and that corresponds to a third scene mode is obtained.

If 3Spline_num is equal to 3, a spline curve parameter obtaining process 3 is invoked, and a parameter that is of the modified spline curve and that corresponds to a fourth scene mode is obtained.

If 3Spline_num is equal to 4, a spline curve parameter obtaining process 4 is invoked, and a parameter that is of the modified spline curve and that corresponds to a fifth scene mode is obtained.

In an optional case, a value of 3Spline_num may be another integer greater than or equal to 5, and corresponds to another spline curve parameter obtaining process. This is not limited in this embodiment of this application. Optionally, the value of 3Spline_num may be an English letter, a Greek letter, or another preset indication value, and is not necessarily a Roman numeral.

Parameters of the modified spline curve that are obtained by using different spline curve parameter obtaining processes are different, and the parameter of the modified spline curve includes a first coordinate of at least one interpolation point and a plurality of coefficients of the modified spline curve.

The at least one interpolation point constitutes a modified range, a sub-modified range is formed between every two adjacent interpolation points, and the modified spline curve passes through the at least one interpolation point. For example, the modified spline curve may include a plurality of spline curves. When the spline curve includes a spline curve 1 and a spline curve 2, the spline curve 1 may be an M-degree spline function in a range $[x_{M1}, x_{M2}]$, and the spline curve 2 may be an L-degree spline function in a range $[x_{L1}, x_{L2}]$. An intersection set of the range $[x_{M1}, x_{M2}]$ and the range $[x_{L1}, x_{L2}]$ is empty, or the range $[x_{M1}, x_{M2}]$ and the range $[x_{L1}, x_{L2}]$ have a common endpoint value. The degree M of the spline curve 1 and the degree L of the spline curve 2 may be the same or different. For example, the plurality of modified spline curves may include at least one of a linear spline curve or a cubic spline curve. The modified spline curve may include one, two, three, or more cubic spline curves. A quantity of cubic spline curves is not limited in this embodiment of this application. The cubic spline curve is smoothly connected to the initial tone mapping curve. For example, when the modified spline curve includes the linear spline curve and the cubic spline curve, the cubic spline curve is smoothly connected to both the linear spline curve and the initial tone mapping curve.

A function form of the linear spline curve is $y=ax+b$, and the curve includes two coefficients. At least two known conditions are required for determining the linear spline curve.

A function form of a quadratic spline curve is $y=ax^2+bx+c$, $a \neq 0$, and the curve includes three coefficients. At least three known conditions are required for determining the quadratic spline curve, for example, coordinates of three points through which the quadratic spline curve passes, or coordinates of two points that pass through the quadratic spline curve and a derivative of the quadratic spline curve at one of the points.

A function form of the cubic spline curve is $y=ax^3+bx^2+cx+d$, $a \neq 0$, and the curve includes four coefficients. At least four known conditions are required for determining the cubic spline curve, for example, coordinates of four points through which the cubic spline curve passes through are obtained in advance, or coordinates of two points and derivatives of the cubic spline curve at the two points are obtained in advance.

An N-degree spline curve includes N+1 coefficients, and at least N+1 known conditions are required for determining the N-degree spline curve.

Figure 4A:
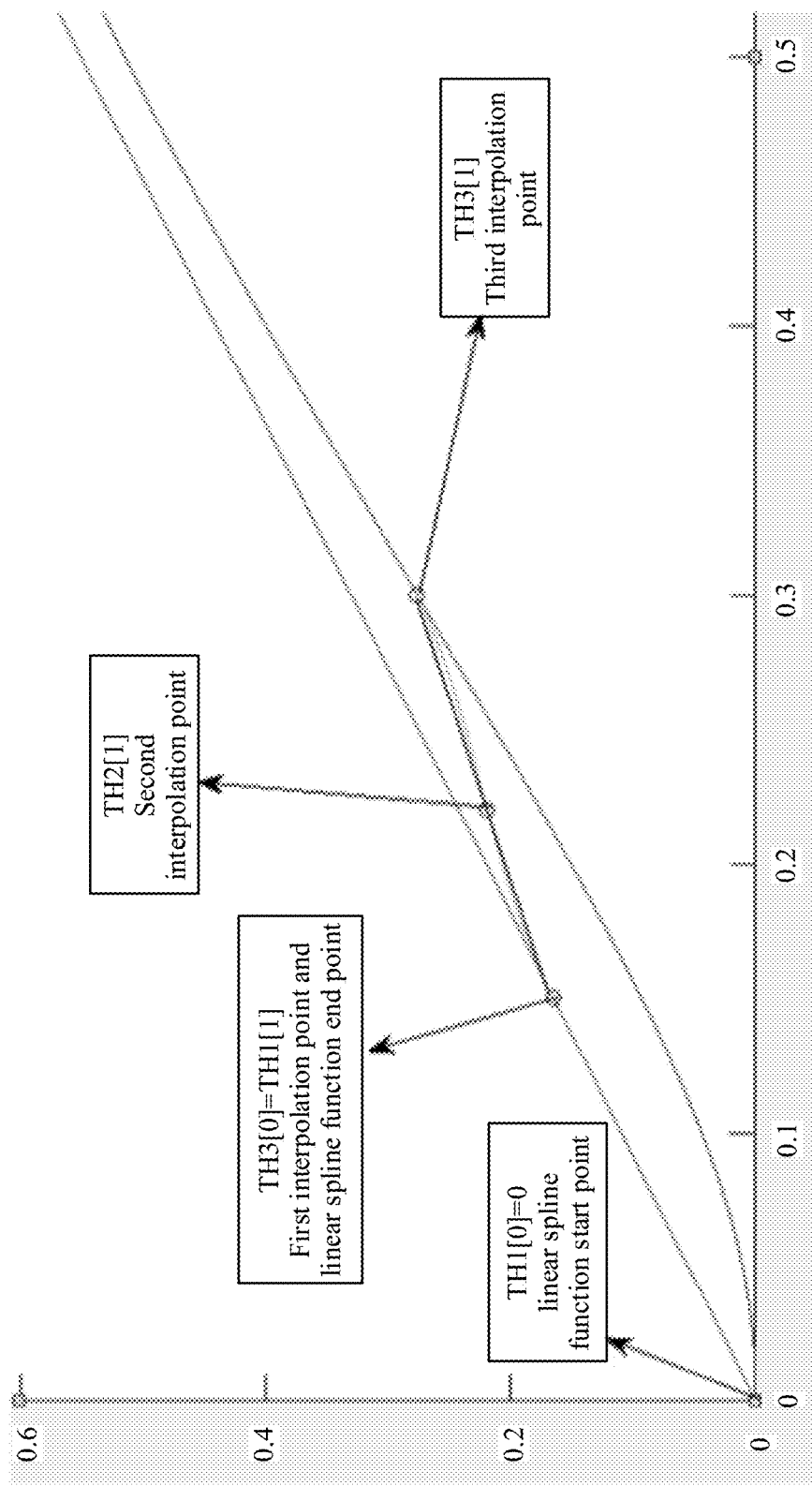
FIG. 4a is a schematic diagram of an exemplary modified spline curve according to an embodiment of this application.

For example, FIG. 4a is a schematic diagram of an exemplary modified spline curve corresponding to the foregoing first scene mode according to an embodiment of this application. The first scene mode corresponds to a case in which an overall scene of an image is dark.

The plurality of interpolation points include a first interpolation point, a second interpolation point, and a third interpolation point. The modified spline curve includes a first spline curve, a second spline curve, and a third spline curve. The first spline curve is a linear spline curve, and both the second spline curve and the third spline curve are cubic spline curves. The first spline curve is a straight line between the origin and the first interpolation point. The second spline curve is a spline curve between the first interpolation point and the second interpolation point. The third spline curve is a spline curve between the second interpolation point and the third interpolation point. The first spline curve is smoothly connected to the second spline curve at the first interpolation point. The second spline curve is smoothly connected to the third spline curve at the second interpolation point. The third spline curve is smoothly connected to the initial tone mapping curve at the third interpolation point. An output parameter of the modified spline curve includes: TH1, TH2, TH3, a slope MB0 of the first spline curve, four coefficients MA1, MB1, MC1, and MD1 of the second spline curve, and four coefficients MA2, MB2, MC2, and MD2 of the third spline curve.

The first spline curve is: $F(L)=MB0 \times L$ (1)

The second spline curve is: $F(L)=MD1 \times (L-TH1)^3 + MC1 \times (L-TH1)^2 + MB1 \times (L-TH1)^1 + MA1$ (2)

The third spline curve is: $F(L)=MD2 \times (L-TH2)^3 + MC2 \times (L-TH2)^2 + MB2 \times (L-TH2)^1 + MA2$ (3)

TH1 is a first coordinate of the first interpolation point, TH2 is a first coordinate of the second interpolation point, TH3 is a first coordinate of the third interpolation point, the first coordinate may be, for example, a horizontal coordinate, and L is an independent variable of a function.

The first scene mode corresponds to the case in which the overall scene of the image is dark. In this case, a dark region is modified, to better display a dark-region detail of the image, so that a pixel whose luminance is lower than a display capability of a display device can have a good display effect on the display device. Specifically, tone mapping is performed, based on the linear spline function formula (1), on pixels that are lower than a first threshold (TH1), so that dark-region detail information of the part is better reserved. Then, a smooth transition between the linear spline function and the initial tone mapping curve is implemented based on a cubic spline function, to prevent an unsmooth tone mapping curve from affecting a tone mapping effect. It should be understood that in the first scene mode, there are two cubic spline curves. In an optional case, there may be only one cubic spline curve, and the first spline curve is smoothly connected to the initial tone mapping curve by using one cubic spline function. In this case, only two interpolation points need to be determined. An obtaining process in the first scene mode is the first obtaining process. For a detailed process of the first obtaining process, refer to the methods shown in FIG. 6a and FIG. 6b or the following Case 3.1. Specifically, in this scenario, the first spline curve improves dark-region luminance compared with a base curve. This is equivalent to allocating more bits to the dark region. The two cubic spline functions implement a smooth transition between the first spline curve and the initial tone mapping curve, and enhancement or weakening processing may be performed on a modified region by controlling a point on and a slope of the curve.

Figure 4B:
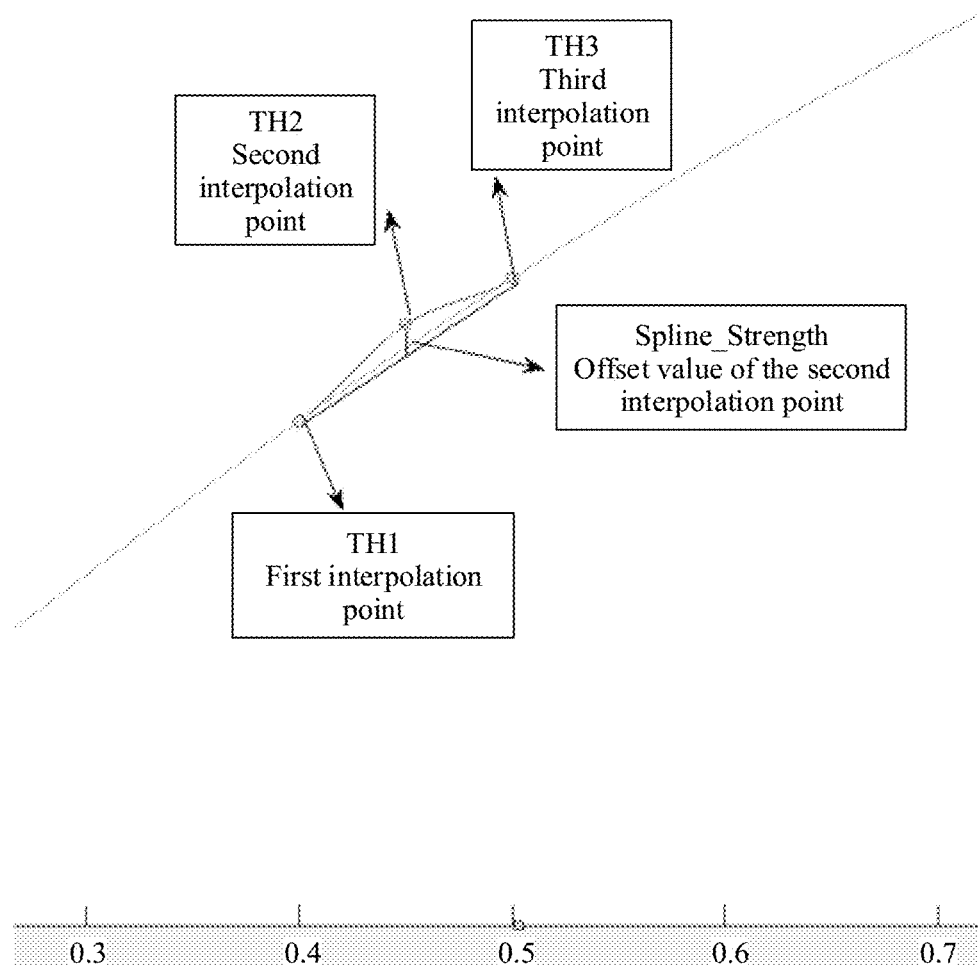
FIG. 4b is a schematic diagram of an exemplary modified spline curve according to an embodiment of this application.

FIG. 4b is a schematic diagram of an exemplary modified spline curve corresponding to the foregoing second scene mode according to an embodiment of this application. The second scene mode corresponds to a case in which an image includes a pixel located in a specific luminance range.

The plurality of interpolation points include a first interpolation point, a second interpolation point, and a third interpolation point. The first interpolation point and the third interpolation point are located on the initial tone mapping curve. The second interpolation point may be located on the initial tone mapping curve, or may not be located on the initial tone mapping curve. When the second interpolation point is not located on the initial tone mapping curve, a vertical coordinate offset value exists between the second interpolation point and the initial tone mapping curve. The modified spline curve includes a first spline curve and a second spline curve. Both the first spline curve and the second spline curve are cubic spline curves. The first spline curve is a spline curve between the first interpolation point and the second interpolation point. The second spline curve is a spline curve between the second interpolation point and the third interpolation point. For example, the first spline curve is smoothly connected to the initial tone mapping curve at the first interpolation point. The second spline curve is smoothly connected to the initial tone mapping curve at the third interpolation point. The first spline curve is smoothly connected to the second spline curve at the second interpolation point. An output parameter of the modified spline curve includes: TH1, TH2, TH3, four coefficients MA1 MB1, MC1, and MD1 of the first spline curve, and four coefficients MA2, MB2, MC2, and MD2 of the second spline curve.

The first spline curve is: $F(L)=MD1 \times (L-TH1)^3 + MC1 \times (L-TH1)^2 + MB1 \times (L-TH1)^1 + MA1$  (4)

The second spline curve is: $F(L)=MD2 \times (L-TH2)^3 + MC2 \times (L-TH2)^2 + MB2 \times (L-TH2)^1 + MA2$  (5)

TH1 is a first coordinate of the first interpolation point, TH2 is a first coordinate of the second interpolation point, TH3 is a first coordinate of the third interpolation point, the first coordinate may be, for example, a horizontal coordinate, and L is an independent variable of a function.

The second scene mode corresponds to the case in which the image includes the pixel located in the specific luminance range. In this case, the specific luminance range is mainly modified, to better display a luminance detail of the image in the range. Specifically, tone mapping is performed on a pixel between the first interpolation point and the second interpolation point and a pixel between the second interpolation point and the third interpolation point based on a cubic spline function, to improve a display effect of the part of pixels. Further, a smooth transition exists between the first spline curve and the second spline curve and between the initial tone mapping curve and each of the first spline curve and the second spline curve, to prevent an unsmooth tone mapping curve from affecting a tone mapping effect. An obtaining process in the second scene mode is the second obtaining process. For a detailed process of the second obtaining process, refer to the method shown in FIG. 7 or the following Case 3.3. Specifically, in this modification manner, any range may be modified. In addition, a modified curve of the modified range is smoothly connected to the initial tone mapping curve, and an interpolation point and an offset value may be controlled to increase image contrast or increase or decrease luminance values of a part of pixels, to achieve a desired effect.

Figure 4C:
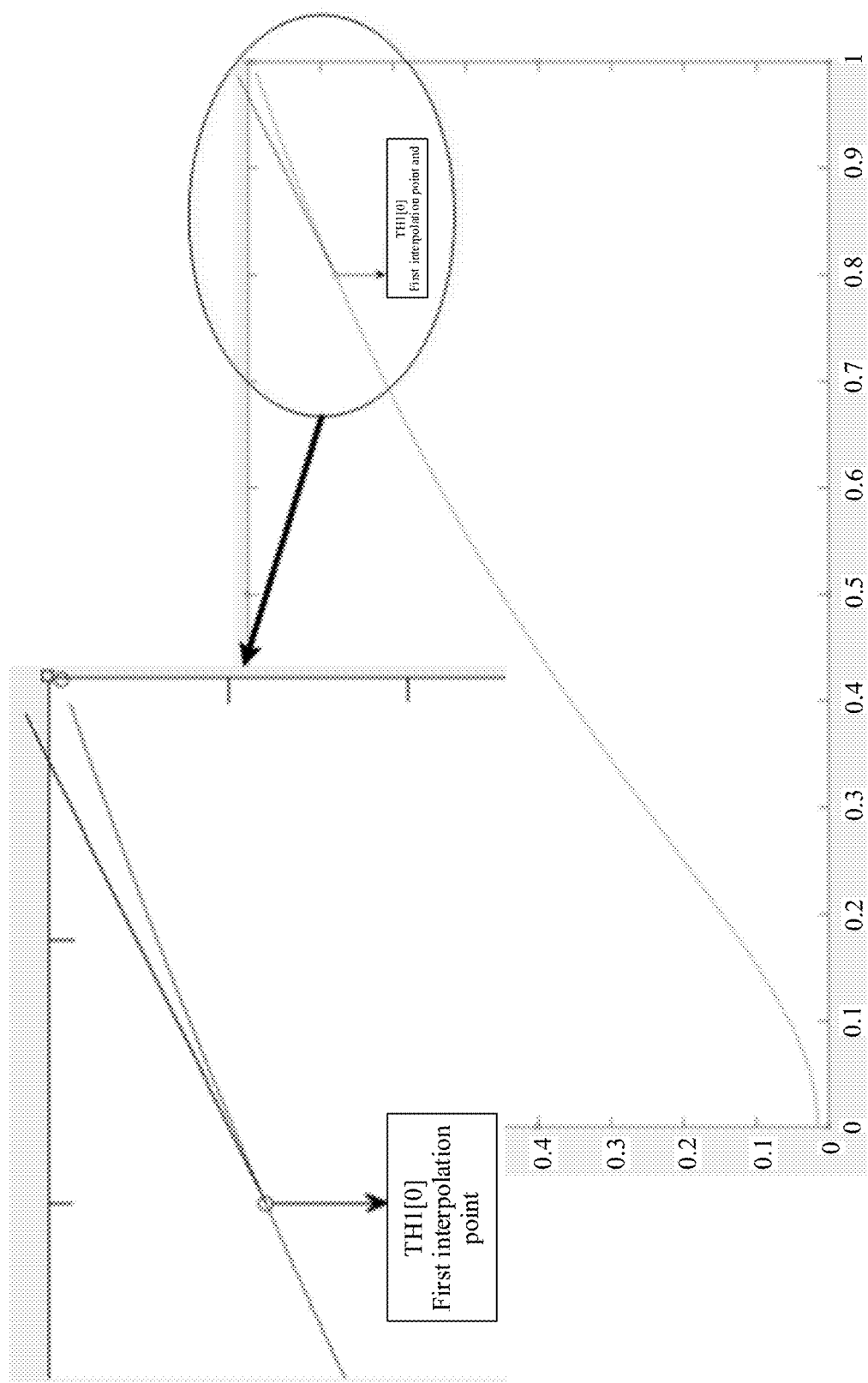
FIG. 4c is a schematic diagram of an exemplary modified spline curve according to an embodiment of this application.

FIG. 4c is a schematic diagram of an exemplary modified spline curve corresponding to the foregoing third scene mode according to an embodiment of this application. The third scene mode corresponds to a case in which an overall scene of an image is bright.

The plurality of interpolation points include a first interpolation point. The modified spline curve includes a first spline curve. The first spline curve is a linear spline curve that passes through the first interpolation point. The first spline curve is smoothly connected to the initial tone mapping curve at the first interpolation point. An output parameter of the modified spline curve includes: TH1, and a first coefficient MA0 and a second coefficient MB0 of the first spline curve.

The first spline curve is: $F(L)=MB0 \times (L-TH1)^1 + MA0$  (6)

TH1 is a first coordinate of the first interpolation point, and the first coordinate may be a horizontal coordinate.

The third scene mode corresponds to the case in which the overall scene of the image is bright. In this case, a bright region is modified, to better display a bright-region detail of the image. Specifically, tone mapping is performed, based on a linear function (the first spline curve), on a pixel region that is greater than a preset threshold (TH1), and the first spline curve is smoothly connected to the initial tone mapping curve at the first interpolation point, to prevent an unsmooth tone mapping curve from affecting a tone mapping effect. Specifically, when tone mapping is performed, by using a linear spline curve, on a pixel whose luminance is greater than the first coordinate of the first interpolation point, it indicates that pixels whose luminance is greater than TH1 are compressed by using a compression rate of the first interpolation point, to avoid excessive compression of a bright-region pixel, and improve an image luminance value. An obtaining process in the third scene mode is the third obtaining process. For a detailed process of the third obtaining process, refer to the method shown in FIG. 8 or the following Case 1.

Figure 4D:
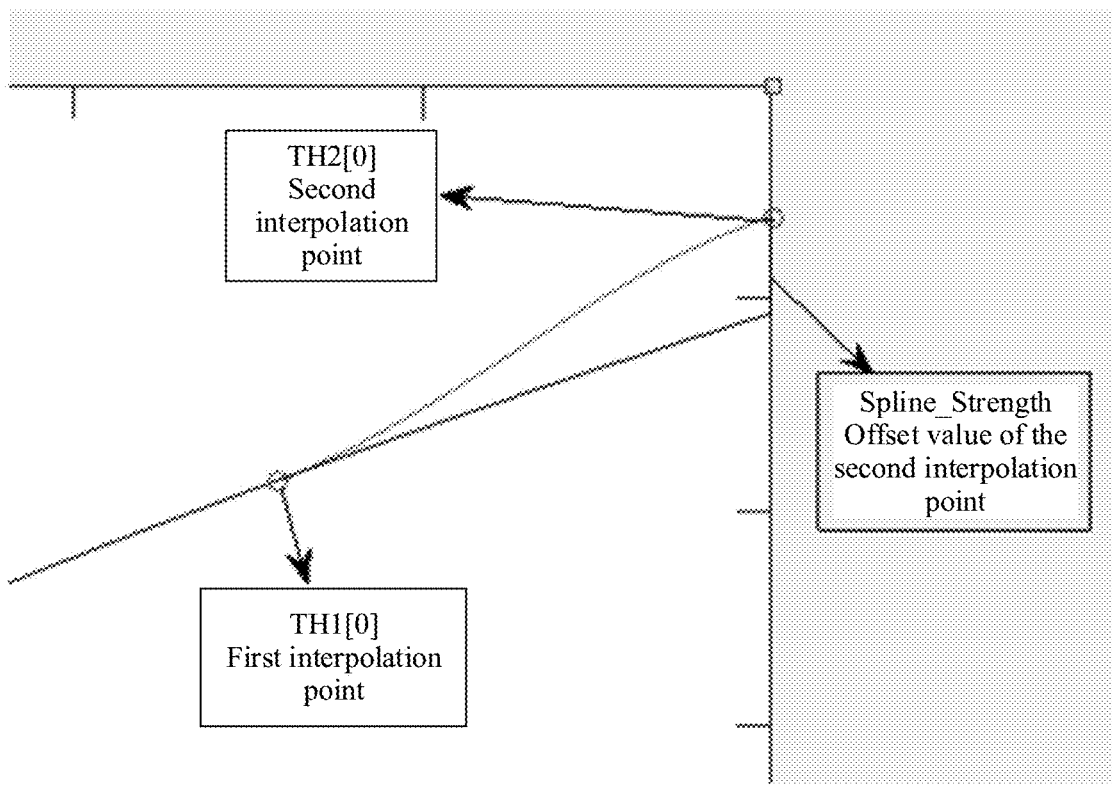
FIG. 4d is a schematic diagram of an exemplary modified spline curve according to an embodiment of this application.

FIG. 4d is a schematic diagram of an exemplary modified spline curve corresponding to the foregoing fourth scene mode according to an embodiment of this application. The fourth scene mode corresponds to a case in which an overall scene of an image is bright.

The plurality of interpolation points include a first interpolation point and a second interpolation point. In an optional case, an offset value Spline_strength exists between the second interpolation point and the initial tone mapping curve in a vertical coordinate direction. The modified spline curve includes a first spline curve. The first spline curve is a cubic spline curve that passes through the first interpolation point and the second interpolation point. The first spline curve is smoothly connected to the initial tone mapping curve at the first interpolation point. An output parameter of the modified spline curve includes: TH1, TH2, and four coefficients MA1, MB1, MC1, and MD1 of the first spline curve.

$$\text{The first spline curve is: } F(L)=MD1\times(L-TH1)^3+ MC1\times(L-TH1)^2+MB1\times(L-TH1)^1+MA1 \quad (7)$$

TH1 is a first coordinate of the first interpolation point, TH2 is a first coordinate of the second interpolation point, the first coordinate may be, for example, a horizontal coordinate, and L is an independent variable of a function.

The fourth scene mode corresponds to the case in which the overall scene of the image is bright. In this case, a bright region is modified, to better display a bright-region detail of the image. Specifically, tone mapping is performed on a pixel region between the first interpolation point and the second interpolation point based on a cubic spline function (Formula (7)), and the cubic spline function is smoothly connected to the initial tone mapping curve at the first interpolation point, to prevent an unsmooth tone mapping curve from affecting a tone mapping effect. Specifically, a luminance value of a pixel between the first interpolation point and a bright-region pixel endpoint may be increased, or a luminance value of a pixel between the first interpolation point and a bright-region pixel endpoint may be decreased. This may achieve a more dazzling effect by increasing luminance, and may enhance the bright-region detail by decreasing luminance. In addition, the increase and the decrease are nonlinear processes, so that contrast can be increased. An obtaining process in the fourth scene mode is the fourth obtaining process. For a detailed process of the fourth obtaining process, refer to the method shown in FIG. 9 or the following Case 2.

Figure 4E:
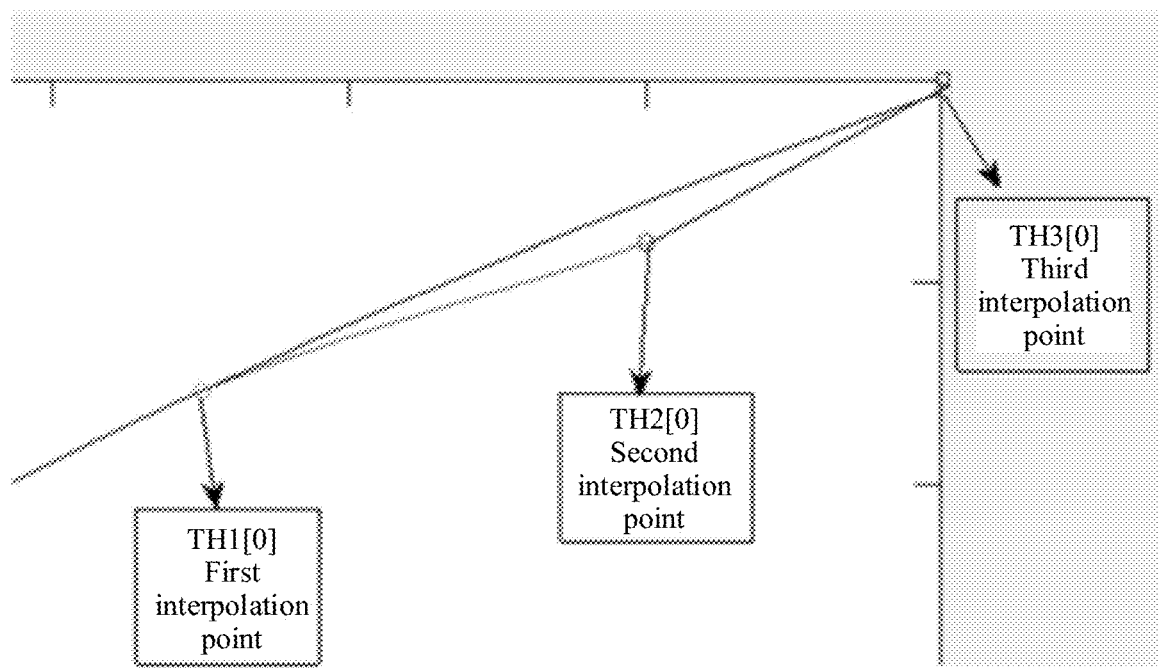
FIG. 4e is a schematic diagram of an exemplary modified spline curve according to an embodiment of this application.

FIG. 4e is a schematic diagram of an exemplary modified spline curve corresponding to the foregoing fifth scene mode according to an embodiment of this application. The fifth scene mode corresponds to a case in which an overall scene of an image is bright.

The plurality of interpolation points include a first interpolation point, a second interpolation point, and a third interpolation point. The modified spline curve includes a first spline curve and a second spline curve. The first spline curve is a cubic spline curve between the first interpolation point and the second interpolation point. The second spline curve is a linear spline curve between the second interpolation point and the third interpolation point. The first spline curve is smoothly connected to the initial tone mapping curve at the first interpolation point. The second spline curve is smoothly connected to the initial tone mapping curve at the third interpolation point. The first spline curve is smoothly connected to the second spline curve at the second interpolation point. An output parameter of the modified spline curve includes: TH1, TH2, TH3, four coefficients MA1, MB1, MC1, and MD1 of the first spline curve, and two coefficients MA2 and MB2 of the second spline curve.

TH1 is a first coordinate of the first interpolation point, TH2 is a first coordinate of the second interpolation point, TH3 is a first coordinate of the third interpolation point, and the first coordinate may be, for example, a horizontal coordinate.

$$\text{The first spline curve is: } F(L)=MD1\times(L-TH1)^3+ MC1\times(L-TH1)^2+MB1\times(L-TH1)^1+MA1 \quad (8)$$

$$\text{The second spline curve is: } F(L)=MB2\times(L-TH2)^1+ MA2 \quad (9)$$

L is an independent variable of a function.

It should be understood that, in the fifth scene mode, the modified spline curve includes one linear spline curve and one cubic spline curve, and positions of the two spline curves are not limited. In FIG. 4e, luminance of a pixel in a pixel range corresponding to the linear spline curve is greater than luminance of a pixel in a pixel range corresponding to the cubic spline curve, that is, a luminance value of the first interpolation point is less than a luminance value of the second interpolation point, and the luminance value of the second interpolation point is less than a luminance value of the third interpolation point. In an optional case, luminance of a pixel in a pixel range corresponding to the linear spline curve may be less than luminance of a pixel in a pixel range corresponding to the cubic spline curve. In this case, a luminance value of the first interpolation point is greater than a luminance value of the second interpolation point, and the luminance value of the second interpolation point is greater than a luminance value of the third interpolation point.

The fifth scene mode corresponds to the case in which the overall scene of the image is bright. In this case, a bright region is modified, to better display a bright-region detail of the image. Specifically, tone mapping is performed on a pixel region between the second interpolation point and the third interpolation point based on a linear spline curve (Formula (9)), and a linear spline function is smoothly connected to the initial tone mapping curve based on a cubic spline function between the first interpolation point and the second interpolation point, to prevent an unsmooth tone mapping curve from affecting a tone mapping effect. Specifically, in this scenario, a cubic spline function may be used between the first interpolation point and the second interpolation point to increase luminance and decrease luminance for the initial tone mapping curve, and the increase and the decrease are nonlinear. Tone mapping is performed between the second interpolation point and the third interpolation point based on a straight line, so that more bits can be allocated to a pixel between the second interpolation point and the third interpolation point, to enhance the bright-region detail. An obtaining process in the fifth scene mode is the fifth obtaining process. For a detailed process of the fifth obtaining process, refer to the method shown in FIG. 10 or the following Case 3.2.

303. Perform tone mapping on the to-be-processed image based on a modified tone mapping curve, where the modified tone mapping curve includes at least a part of the initial tone mapping curve and the modified spline curve.

Figure 4F:
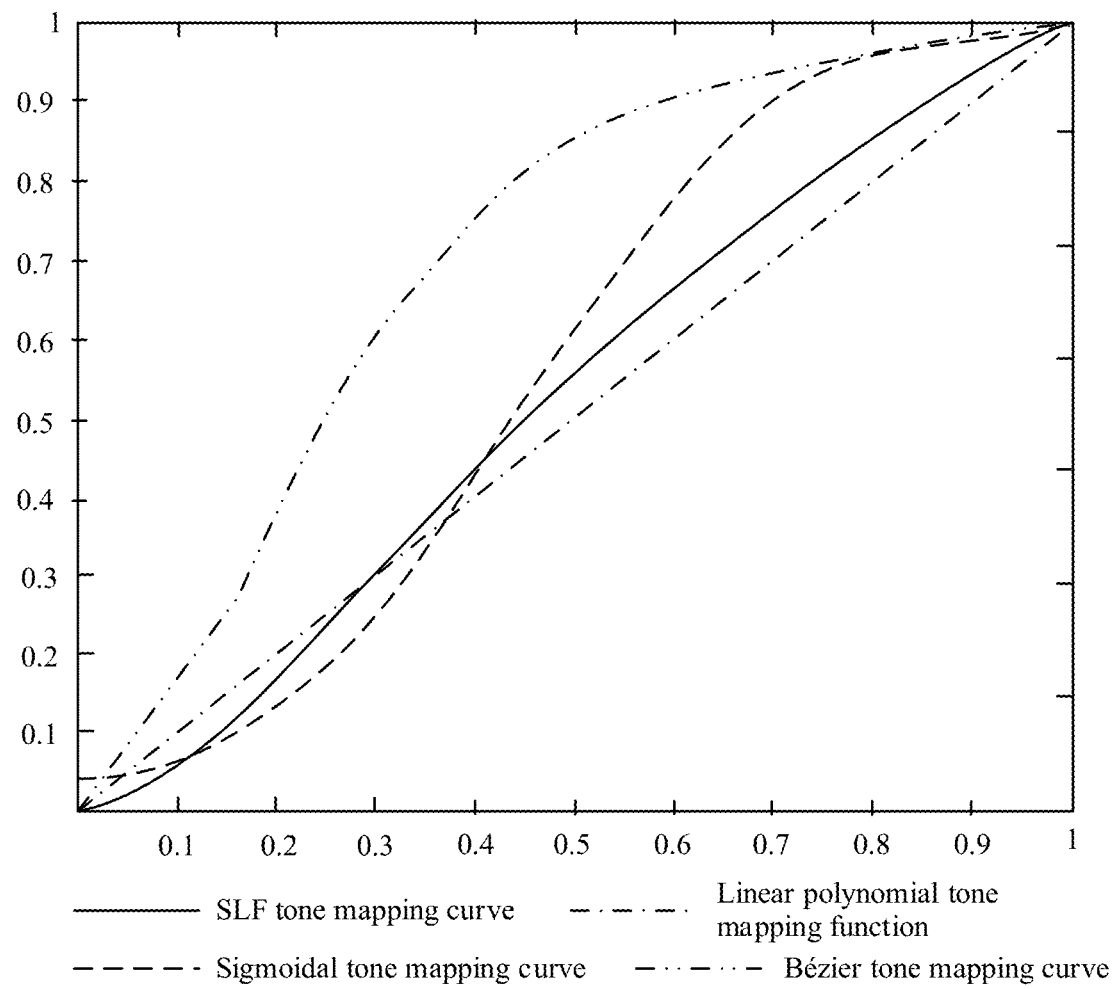
FIG. 4f is a schematic diagram of several exemplary initial tone mapping curves according to an embodiment of this application.

It should be understood that the initial tone mapping curve may be any form of curve that may be used in a tone mapping process. Specifically, FIG. 4f shows several possible forms of the initial tone mapping curve. For example, the initial tone mapping curve may be a curve obtained through normalization processing, that is, coordinates of any point on the initial tone mapping curve are (first coordinate value, second coordinate value), a value of the first coordinate value is between 0 and 1, and a value of the second coordinate value is between 0 and 1. The following describes the initial tone mapping curve obtained through normalization processing. It should be understood that this application sets no limitation thereto.

An initial tone mapping curve shown by a solid line in FIG. 4f is also referred to as an SLF tone mapping curve, and meets the following formula:

$$L' = a \times \left(\frac{p \times L}{(p-1) \times L + 1}\right)^m + b \quad (10)$$

L represents a signal value existing before mapping, and L' represents a signal value existing after mapping. In an optional case, the signal value existing before mapping is a linear signal value, the signal value existing after mapping is a non-linear signal value, p, a, m, and b are all dynamic range mapping coefficients, $0 \leq L \leq 1$, $0 \leq L' \leq 1$, a is directly proportional to a dynamic range display capability of the display device, and is inversely proportional to a dynamic range of a target picture, and b is directly proportional to a minimum luminance display capability of the display device.

An initial tone mapping curve shown by a dash-dot line in FIG. 4f is referred to as a linear polynomial tone mapping function, and meets the following formula:

$$L' = a \times L + b \quad (11)$$

L represents a signal value existing before mapping, and L' represents a signal value existing after mapping. In an optional case, the signal value existing before mapping is a linear signal value, the signal value existing after mapping is a non-linear signal value, both a and b are dynamic range mapping coefficients, $0 \leq L \leq 1$, $0 \leq L' \leq 1$, a is directly proportional to a dynamic range display capability of the display device, and is inversely proportional to a dynamic range of a target picture, and b is directly proportional to a minimum luminance display capability of the display device.

An initial tone mapping curve shown by a dashed line in FIG. 4f is also referred to as a sigmoidal tone mapping curve, and meets the following formula:

$$L' = \frac{c_1 + c_2 \times L^n}{1 + c_3 \times L^n} \quad (12)$$

L represents a signal value existing before mapping, and L' represents a signal value existing after mapping. In an optional case, the signal value existing before mapping is a linear signal value, the signal value existing after mapping is a non-linear signal value, $c_1$, $c_2$, $c_3$, and n are all dynamic range mapping coefficients, $0 \leq L \leq 1$, $0 \leq L' \leq 1$, and $c_1$, $c_2$, $C_3$, and n are all related to average luminance, maximum luminance, and minimum luminance of a target picture, and are related to minimum display luminance and maximum display luminance of the display device.

An initial tone mapping curve shown by a dash-dot-dot line in FIG. 4f is also referred to as a Bézier tone mapping curve, and meets the following formula:

$$L' = \sum_{\rho=0}^{N} \binom{N}{\rho} \times L^\rho \times (1-L)^{N-\rho} \times P_\rho \quad (13)$$

L represents a signal value existing before mapping, and L' represents a signal value existing after mapping. In an optional case, the signal value existing before mapping is a linear signal value, the signal value existing after mapping is a non-linear signal value, n, N, and ρ are all dynamic range mapping coefficients, $0 \leq L \leq 1$, $0 \leq L' \leq 1$, and n, N, and ρ are related to luminance distribution of a target image, and are also related to average luminance of the target image.

The SLF formula as an example, and p and m may be determined by using overall luminance of an image. When the overall image is bright, a value of p is small, and a value of m is large. When the overall image is dark, a value of p is large, and a value of m is small. A value range of p may be between 3 and 6. A value range of m may be between 2 and 4, and m is generally equal to 2.4.

It should be understood that the modified tone mapping curve may be a piecewise polynomial function. For example, a plurality of piecewise functions of the modified tone mapping curve are smoothly connected to each other. Specifically, when a to-be-processed pixel is located in the modified range, tone mapping is performed on the to-be-processed pixel based on the modified spline curve. When a to-be-processed pixel is not located in the modified range, tone mapping is performed on the to-be-processed pixel based on the initial tone mapping curve. It should be understood that, when a range in which the to-be-processed pixel is located is determined, a pixel value of the to-be-processed pixel may be compared with first coordinate values of a plurality of interpolation points. For example, when the to-be-processed pixel is in an RGB format, a maximum value in RGB components may be used as the pixel value of the to-be-processed pixel. When the to-be-processed pixel is in a YUV format, a Y component may be used as the pixel value of the to-be-processed pixel.

For example, the modified range includes a first modified range, a second modified range, and a third modified range. The first modified range corresponds to a first spline function, the second modified range corresponds to a second spline function, and the third modified range corresponds to a third spline function. In this case, when the to-be-processed pixel is located in the first modified range, tone mapping is performed on the to-be-processed pixel based on the first spline function. When the to-be-processed pixel is located in the second modified range, tone mapping is performed on the to-be-processed pixel based on the second spline function. When the to-be-processed pixel is located in the third modified range, tone mapping is performed on the to-be-processed pixel based on the third spline function. When the to-be-processed pixel is not located in the three modified ranges, tone mapping is performed on the to-be-processed pixel based on the initial tone mapping curve.

For example, for the foregoing first scene mode, the following processing is correspondingly performed:

When the to-be-processed pixel is located between the origin and the first interpolation point, tone mapping is performed on the to-be-processed pixel based on Formula (1).

When the to-be-processed pixel is located between the first interpolation point and the second interpolation point, tone mapping is performed on the to-be-processed pixel based on Formula (2).

When the to-be-processed pixel is located between the second interpolation point and the third interpolation point, tone mapping is performed on the to-be-processed pixel based on Formula (3).

When the pixel value of the to-be-processed pixel is greater than the first coordinate TH3 of the third interpolation point, tone mapping is performed on the to-be-processed pixel based on the initial tone mapping curve.

For the foregoing second scene mode, the following processing is correspondingly performed:

When the to-be-processed pixel is located between the first interpolation point and the second interpolation point, tone mapping is performed on the to-be-processed pixel based on Formula (4).

When the to-be-processed pixel is located between the second interpolation point and the third interpolation point, tone mapping is performed on the to-be-processed pixel based on Formula (5).

When the pixel value of the to-be-processed pixel is greater than the first coordinate TH3 of the third interpolation point, tone mapping is performed on the to-be-processed pixel based on the initial tone mapping curve.

For the foregoing third scene mode, the following processing is correspondingly performed:

When the pixel value of the to-be-processed pixel is less than the first coordinate TH1 of the first interpolation point, tone mapping is performed on the to-be-processed pixel based on the initial tone mapping curve.

When the pixel value of the to-be-processed pixel is greater than the first coordinate TH1 of the first interpolation point, tone mapping is performed on the to-be-processed pixel based on Formula (6).

For the foregoing fourth scene mode, the following processing is correspondingly performed:

When the pixel value of the to-be-processed pixel is less than the first coordinate TH1 of the first interpolation point, tone mapping is performed on the to-be-processed pixel based on the initial tone mapping curve.

When the to-be-processed pixel is located between the first interpolation point and the second interpolation point, tone mapping is performed on the to-be-processed pixel based on Formula (7).

For the foregoing fifth scene mode, the following processing is correspondingly performed:

When the pixel value of the to-be-processed pixel is less than the first coordinate TH1 of the first interpolation point, tone mapping is performed on the to-be-processed pixel based on the initial tone mapping curve.

When the to-be-processed pixel is located between the first interpolation point and the second interpolation point, tone mapping is performed on the to-be-processed pixel based on Formula (8).

When the to-be-processed pixel is located between the second interpolation point and the third interpolation point, tone mapping is performed on the to-be-processed pixel based on
Formula (9).

In the image processing method provided in this embodiment of this application, a scene mode applicable to the to-be-processed image is determined based on the mode indication value in the dynamic metadata, and the initial tone mapping curve is properly and flexibly modified, so that an image display effect can be adjusted for regions with different luminance, to enhance a luminance change detail of the image, and bring better visual experience to a user. A plurality of styles of display effects such as softness, vividness, brightness, and dusk may be obtained by performing a plurality of forms of fine-tuning on the tone mapping curve.

In the image processing method provided in this embodiment of this application, any part of a curve can be adaptively modified based on a scene requirement, to increase luminance, increase contrast, blur partial information, and the like. For example, a display effect of a dark-region detail is improved by increasing dark-region luminance, and contrast may be increased by decreasing dark-region luminance, or a large quantity of bits may be allocated to a bright region to display a bright-region detail. In addition, any part of a curve may be modified to achieve a desired specific effect.

Figure 5:
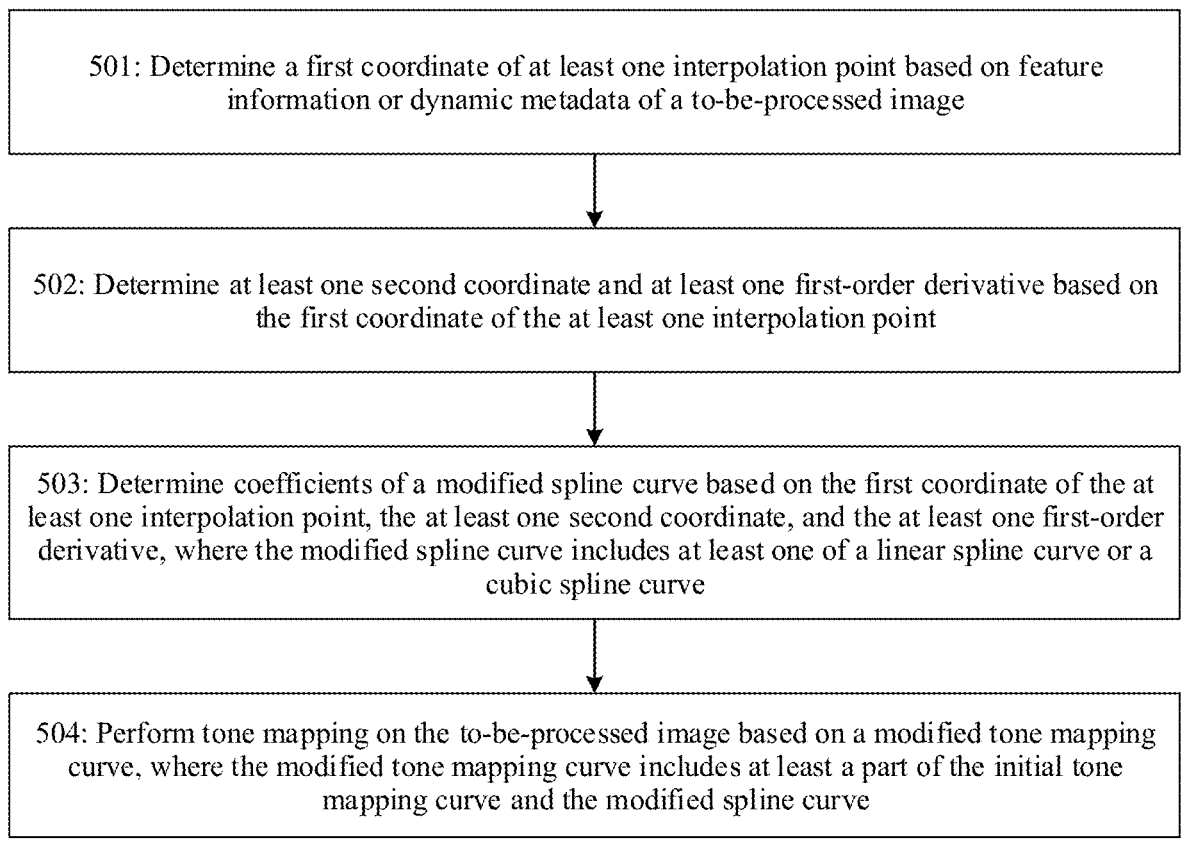
FIG. 5 is a flowchart of an exemplary method for obtaining a parameter of a modified spline curve according to an embodiment of this application.

FIG. 5 is a flowchart of a method for obtaining a parameter of a modified spline curve according to an embodiment of this application. The method includes:

501. Determine a first coordinate of at least one interpolation point based on feature information or dynamic metadata of a to-be-processed image.

For example, the at least one interpolation point may include only a first interpolation point, or may include a first interpolation point and a second interpolation point, or may include a first interpolation point, a second interpolation point, and a third interpolation point. For example, in the third scene mode in this application, only one interpolation point needs to be determined. In the fourth scene mode shown in this application, two interpolation points need to be determined. In each of the first scene mode, the second scene mode, and the fifth scene mode in this application, three interpolation points need to be determined.

502. Determine at least one second coordinate and at least one first-order derivative based on the first coordinate of the at least one interpolation point.

503. Determine coefficients of a modified spline curve based on the first coordinate of the at least one interpolation point, the at least one second coordinate, and the at least one first-order derivative, where the modified spline curve includes at least one of a linear spline curve or a cubic spline curve.

In this embodiment of this application, several example cases of determining the modified spline curve are provided:

Case 1: A case in which one interpolation point is included.

The at least one interpolation point includes a first interpolation point. The modified spline curve includes a first spline curve. The first spline curve is a linear spline curve that passes through the first interpolation point. The coefficients of the modified spline curve include a first coefficient MA0 and a second coefficient MB0. The linear spline curve is smoothly connected to an initial tone mapping curve at the first interpolation point. Specifically, a first-order derivative of the linear spline curve at the first interpolation point is equal to a first-order derivative of the initial tone mapping curve at the first interpolation point.

Correspondingly, step 501 specifically includes: determining a first coordinate TH1 of the first interpolation point based on data included in the dynamic metadata.

Step 502 specifically includes:

calculating a second coordinate VA1 of the first interpolation point on the initial tone mapping curve and the first-order derivative GD1 of the initial tone mapping curve at the first interpolation point based on TH1.

Step 503 specifically includes:

determining GD1 as a second coefficient MB0 of the first spline curve, and determining VA1 as a first coefficient MA0 of the first spline curve; and obtaining the first spline curve based on MB0 and MA0.

Figure 8:
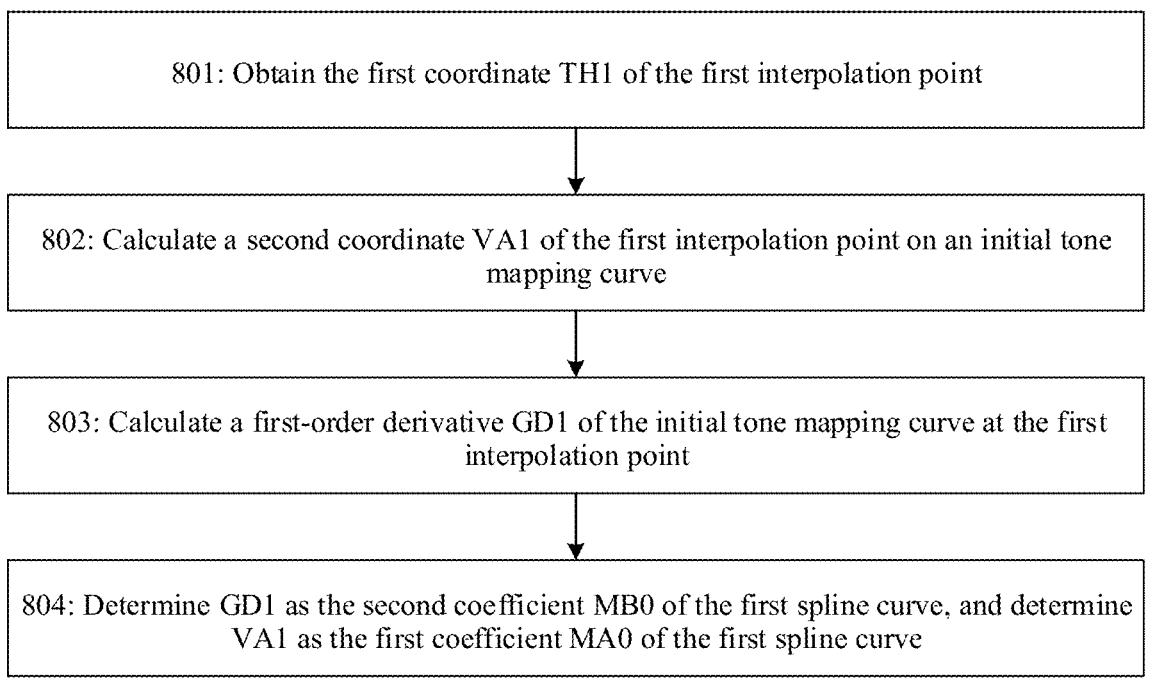
FIG. 8 is a flowchart of an exemplary method for obtaining a parameter of a modified spline curve according to an embodiment of this application.

A specific solution corresponding to Case 1 is shown in the solution in FIG. 8.

Case 2: A case in which two interpolation points are included.

The at least one interpolation point includes a first interpolation point and a second interpolation point. The modified spline curve includes a first spline curve. The first spline curve is a cubic spline curve. The second interpolation point may be one of endpoints of an initial tone mapping curve. In the fourth scene mode shown in embodiments of this application, the second interpolation point is a bright-region endpoint of the initial tone mapping curve. The modified spline curve is smoothly connected to the initial tone mapping curve at the first interpolation point.

Correspondingly, step 501 specifically includes:

determining a first coordinate TH1 of the first interpolation point and a first coordinate TH2 of the second interpolation point based on data included in the dynamic metadata. For example, TH1=A, TH2=B, where A and B are constants included in the dynamic metadata, or A and B are calculated based on the data included in the dynamic metadata.

Step 502 specifically includes:

respectively calculating second coordinates VA1 and VA2 of the first interpolation point and the second interpolation point on the initial tone mapping curve based on TH1 and TH2; and calculating a first-order derivative GD1 of the initial tone mapping curve at the first interpolation point and a first-order derivative GD2 of the initial tone mapping curve at the second interpolation point based on TH1 and TH2.

Step 503 specifically includes:

determining VA1 as a first coefficient MA1 of the first spline curve, and determining GD1 as a second coefficient MB1 of the first spline curve;

constructing, based on TH1, TH2, VA2, and GD2, a system of equations that includes two equations;

solving the system of equations to obtain a third coefficient MC1 and a fourth coefficient MD1 of the first spline curve; and obtaining the first spline curve based on MA1, MB1, MC1, and MD1.

The constructing, based on TH1, TH2, VA2, and GD2, a system of equations that includes two equations specifically includes:

enabling a second coordinate of the second interpolation point on the first spline curve to be a sum of VA2 and S1, to obtain a first equation, where S1 is a coordinate offset value included in the dynamic metadata; and enabling a first-order derivative of the first spline curve at the second interpolation point to be a sum of GD2 and S2, to obtain a second equation, where S2 is a slope offset value included in the dynamic metadata.

Figure 9:
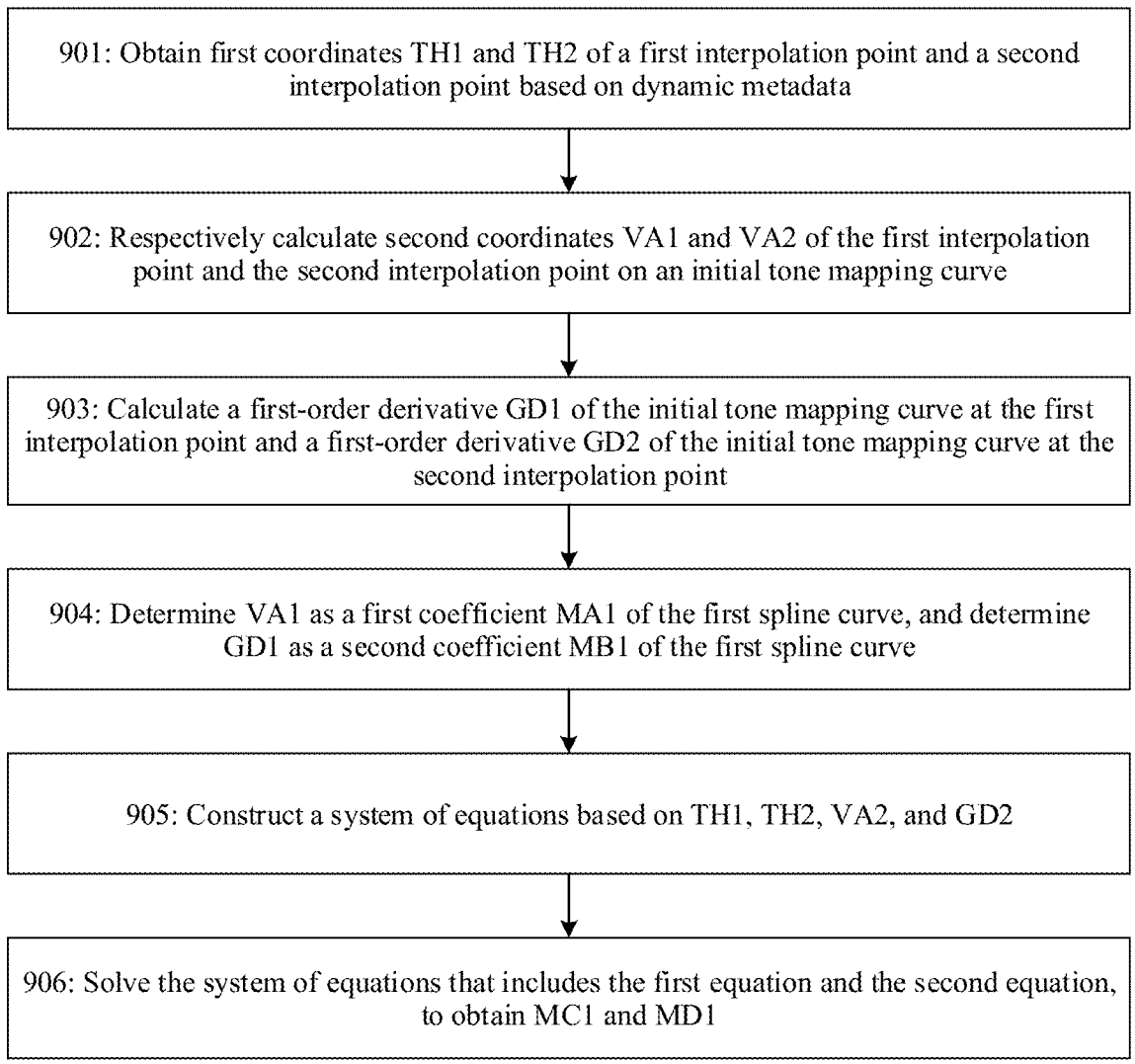
FIG. 9 is a flowchart of an exemplary method for obtaining a parameter of a modified spline curve according to an embodiment of this application.

A specific solution corresponding to Case 2 is shown in the solution in FIG. 9.

For the case in which two interpolation points are included, an optional case is further included: A first interpolation point is a point close to a dark-region endpoint. The modified spline curve includes a first spline curve and a second spline curve. The first spline curve is a linear spline curve. The second spline curve is a cubic spline curve. The first spline curve is a straight line that passes through the origin and the first interpolation point. The second spline curve passes through the first interpolation point and a second interpolation point. The linear spline curve is smoothly connected to the cubic spline curve at the first interpolation point. The cubic spline curve is smoothly connected to an initial tone mapping curve at the second interpolation point. In this case, the dark region may be modified.

Case 3: A case in which three interpolation points are included.

The at least one interpolation point includes a first interpolation point, a second interpolation point, and a third interpolation point.

Case 3.1: The modified spline curve includes one linear spline curve and two cubic spline curves (the first scene mode shown in embodiments of this application).

Correspondingly, step 501 specifically includes:

determining a first coordinate TH1 of the first interpolation point based on at least one of a maximum luminance value maxL of the to-be-processed image and an average luminance value avgL of the to-be-processed image that are included in the dynamic metadata;

$$TH2=TH1+B;\text{ and}$$

$$TH3=TH2+C*TH2-D*CH2.$$

TH2 is a first coordinate of the second interpolation point, TH3 is a first coordinate of the third interpolation point, and B, C, and D are all constants. In an optional case, B, C, and D are constants included in the dynamic metadata.

The method further includes:

obtaining a first-order derivative MB0 of a first spline curve based on the average luminance value avgL that is of the to-be-processed image and that is included in the dynamic metadata.

Step 502 specifically includes:

calculating a second coordinate VA1 of the first interpolation point on the first spline curve based on TH1 and MB0;

calculating a second coordinate VA3 of the third interpolation point on an initial tone mapping curve based on TH3;

calculating a second coordinate VA2 of the second interpolation point on a first straight line, where the first straight line is a straight line on which the first interpolation point and the third interpolation point are located; and calculating a first-order derivative GD3 of the initial tone mapping curve at the third interpolation point.

Step 503 specifically includes:

determining VA1 as a first coefficient MA1 of a second spline curve; determining MB0 as a second coefficient MB1 of the second spline curve;

determining a sum of VA2 and an offset value as a first coefficient MA2 of a third spline curve, where the offset value is 0, a positive number, or a negative number, where it should be understood that the offset value may be transmitted to a tone mapping device by using the dynamic metadata, or may be defined in program code; constructing, based on TH1, TH2, TH3, VA2, VA3, GD3, and a derivative relationship between the second spline curve and the third spline curve at the second interpolation point, a system of equations that includes five equations; and solving the system of equations that includes five equations, to obtain MC1, MD1, MB2, MC2, and MD2.

The constructing, based on TH1, TH2, TH3, VA2, VA3, GD3, and a derivative relationship between the second spline curve and the third spline curve at the second interpolation point, a system of equations that includes five equations specifically includes:

enabling a second coordinate of the second interpolation point on the second spline curve to be VA2, to obtain a first equation; enabling a second coordinate of the third interpolation point on the third spline curve to be VA3, to obtain a second equation; enabling a first-order derivative of the third spline curve at the third interpolation point to be GD3, to obtain a third equation;

enabling first-order derivatives of the second spline curve and the third spline curve at the second interpolation point to be equal, to obtain a fourth equation; and enabling second-order derivatives of the second spline curve and the third spline curve at the second interpolation point to be equal, to obtain a fifth equation.

Figure 6A:
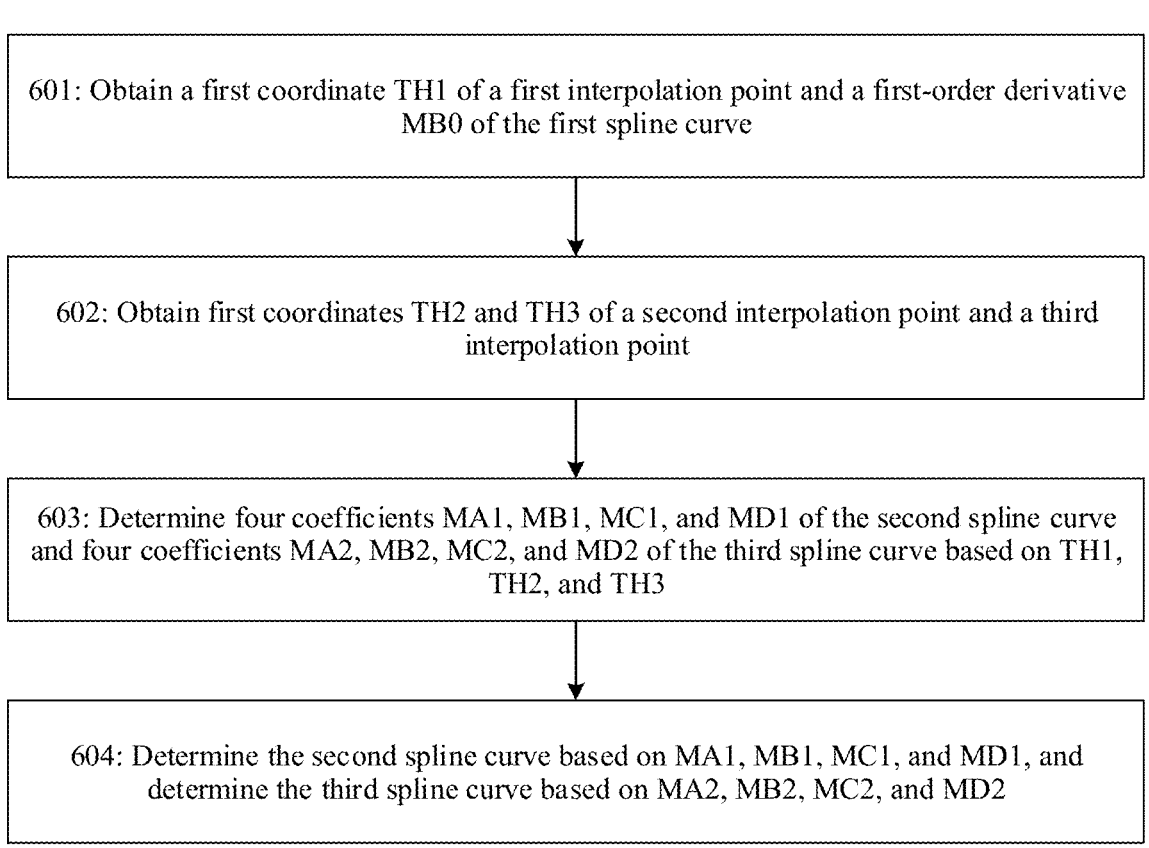
FIG. 6a is a flowchart of an exemplary method for obtaining a parameter of a modified spline curve according to an embodiment of this application.
Figure 6B:
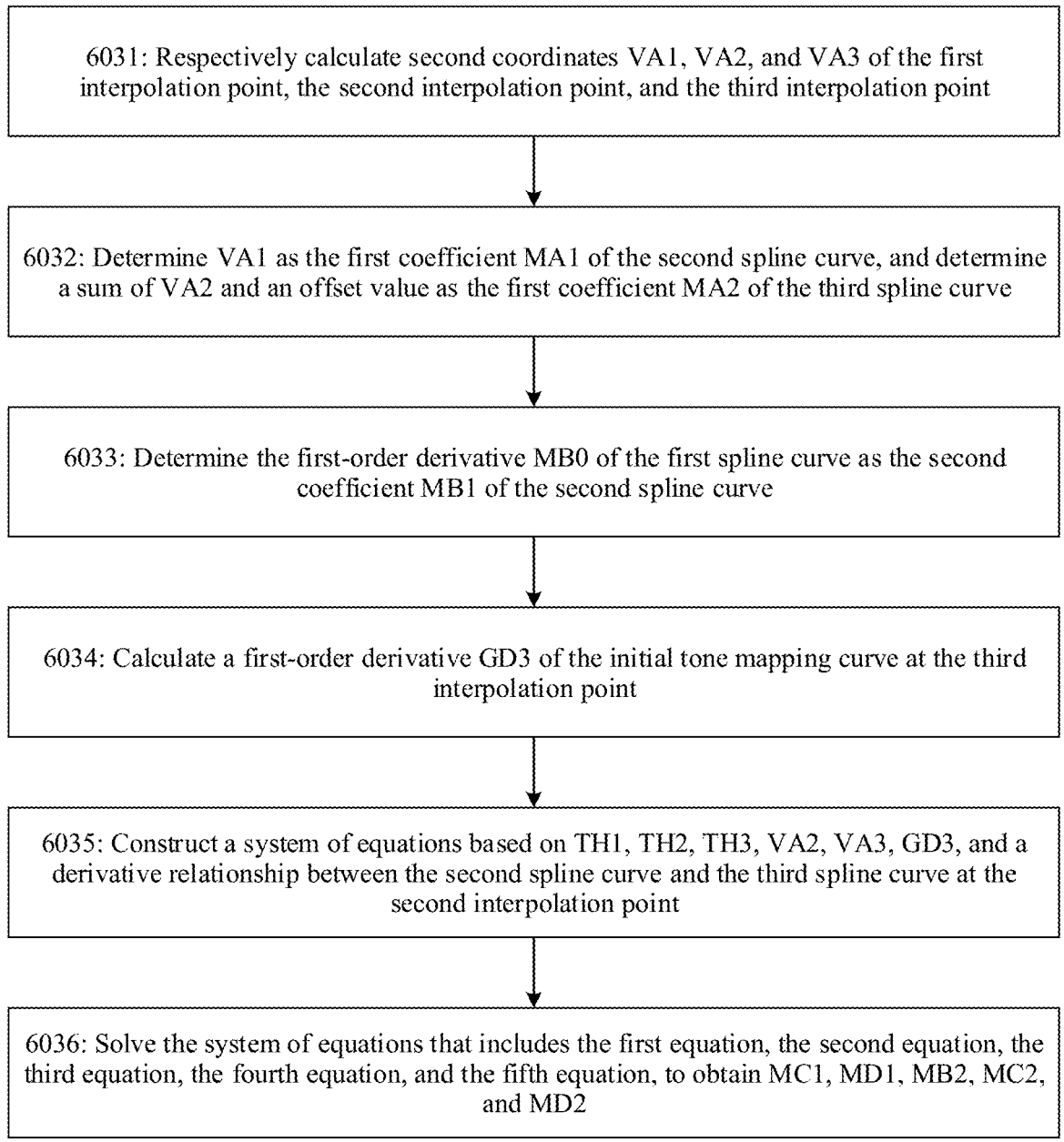
FIG. 6b is a flowchart of an exemplary method for obtaining a parameter of a modified spline curve according to an embodiment of this application.

A specific solution corresponding to Case 3.1 is shown in the solutions in FIG. 6a and FIG. 6b.

Case 3.2: The modified spline curve includes a first spline curve and a second spline curve. The first spline curve is a cubic spline curve that passes through the first interpolation point and the second interpolation point. The second spline curve is a linear spline curve that passes through the second interpolation point and the third interpolation point. The coefficients of the modified spline curve include a first coefficient MA1, a second coefficient MB1, a third coefficient MC1, and a fourth coefficient MD1 of the first spline curve, and a first coefficient MA2 and a second coefficient MB2 of the second spline curve (the fifth scene mode shown in embodiments of this application).

Correspondingly, step 501 specifically includes:

determining a first coordinate TH1 of the first interpolation point, a first coordinate TH2 of the second interpolation point, and a first coordinate TH3 of the third interpolation point based on data included in the dynamic metadata. For example, TH1=A, TH2=B, TH3=C, where A, B, and C are constants included in the dynamic metadata, or A, B, and C are calculated based on the data included in the dynamic metadata.

Step 502 specifically includes:

respectively calculating second coordinates VA1 and VA3 of the first interpolation point and the third interpolation point on an initial tone mapping curve based on TH1 and TH3, where VA1 is the first coefficient MA1 of the first spline curve;

calculating a second coordinate VA2 of the second interpolation point on a first straight line, where the first straight line is a straight line on which the first interpolation point (TH1, VA1) and the third interpolation point (TH3, VA3) are located; and calculating a first-order derivative GD1 of the initial tone mapping curve at the first interpolation point.

Step 503 specifically includes:

determining VA1 as the first coefficient MA1 of the first spline curve; determining GD1 as the second coefficient MB1 of the first spline curve; determining, as the first coefficient MA2 of the second spline curve, a sum of VA2 and a coordinate offset value included in the dynamic metadata, where in an optional case, the dynamic metadata includes the coordinate offset value;

constructing, based on TH1, TH2, TH3, VA2, VA3, and a derivative relationship between the first spline curve and the second spline curve at the second interpolation point, a system of equations that includes three equations; and solving the system of equations that includes three equations, to obtain MC1, MD1, and MB2.

The constructing, based on TH1, TH2, TH3, VA2, VA3, and a derivative relationship between the first spline curve and the second spline curve at the second interpolation point, a system of equations that includes three equations specifically includes:

enabling a second coordinate of the second interpolation point on the first spline curve to be VA2, to obtain a first equation;

enabling a second coordinate of the third interpolation point on the second spline curve to be VA3, to obtain a second equation; and enabling first-order derivatives of the first spline curve and the second spline curve at the second interpolation point to be equal, to obtain a third equation.

A specific solution corresponding to Case 3.2 is shown in the solution in FIG. 10.

Case 3.3: The modified spline curve includes a first spline curve and a second spline curve. The first spline curve is a cubic spline curve that passes through the first interpolation point and the second interpolation point. The second spline curve is a cubic spline curve that passes through the second interpolation point and the third interpolation point. The coefficients of the modified spline curve include a first coefficient MA1, a second coefficient MB1, a third coefficient MC1, and a fourth coefficient MD1 of the first spline curve, and a first coefficient MA2, a second coefficient MB2, a third coefficient MC2, and a fourth coefficient MD2 of the second spline curve (the second scene mode shown in embodiments of this application).

Correspondingly, step 501 specifically includes:

determining a first coordinate TH1 of the first interpolation point, a first coordinate TH2 of the second interpolation point, and a first coordinate TH3 of the third interpolation point based on data included in the dynamic metadata. For example, TH1=A, TH2=B, TH3=C, where A, B, and C are constants included in the dynamic metadata, or A, B, and C are calculated based on the data included in the dynamic metadata.

Step 502 specifically includes:

respectively calculating second coordinates VA1 and VA3 of the first interpolation point and the third interpolation point on an initial tone mapping curve based on TH1 and TH3;

calculating a second coordinate VA2 of the second interpolation point on a first straight line, where the first straight line is a straight line on which the first interpolation point and the third interpolation point are located; and calculating a first-order derivative GD1 of the initial tone mapping curve at the first interpolation point and a first-order derivative GD3 of the initial tone mapping curve at the third interpolation point.

Step 503 specifically includes:

determining VA1 as the first coefficient MA1 of the first spline curve;

determining GD1 as the second coefficient MB1 of the first spline curve;

determining a sum of VA2 and an offset value as the first coefficient MA2 of the second spline curve, where the offset value is 0, a positive number, or a negative number, and optionally, the offset value may be included in the dynamic metadata;

constructing, based on TH1, TH2, TH3, VA2, VA3, GD3, and a derivative relationship between the first spline curve and the second spline curve at the second interpolation point, a system of equations that includes five equations; and solving the system of equations that includes five equations, to obtain MC1, MD1, MB2, MC2, and MD2.

The constructing, based on TH1, TH2, TH3, VA2, VA3, GD3, and a derivative relationship between the first spline curve and the second spline curve at the second interpolation point, a system of equations that includes five equations specifically includes:

enabling a second coordinate of the second interpolation point on the first spline curve to be VA2, to obtain a first equation;

enabling a second coordinate of the third interpolation point on the second spline curve to be VA3, to obtain a second equation;

enabling a first-order derivative of the second spline curve at the third interpolation point to be GD3, to obtain a third equation;

enabling first-order derivatives of the first spline curve and the second spline curve at the second interpolation point to be equal, to obtain a fourth equation; and enabling second-order derivatives of the first spline curve and the second spline curve at the second interpolation point to be equal, to obtain a fifth equation.

Figure 7:
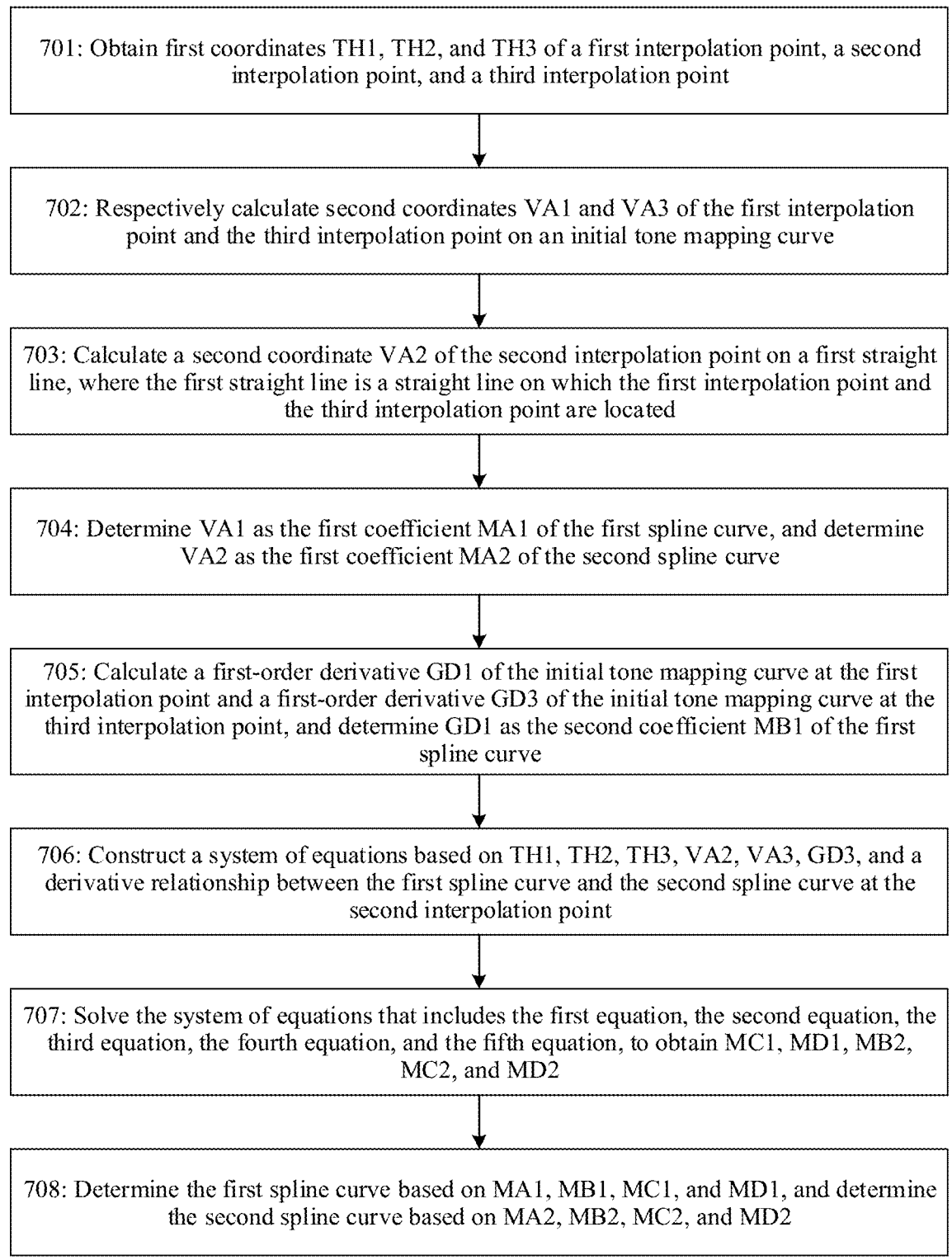
FIG. 7 is a flowchart of an exemplary method for obtaining a parameter of a modified spline curve according to an embodiment of this application.

A specific solution corresponding to Case 3.3 is shown in the solution in FIG. 7.

504. Perform tone mapping on the to-be-processed image based on a modified tone mapping curve, where the modified tone mapping curve includes at least a part of the initial tone mapping curve and the modified spline curve.

For step 504, refer to the descriptions in the part of step 303. Details are not described herein again.

In an optional case, before step 501, the method further includes:

determining a target scene mode applicable to the to-be-processed image based on a mode indication value in the dynamic metadata, where the at least one interpolation point and the modified spline curve are related to the target scene mode. Specifically, a quantity of the at least one interpolation point and determining of the linear spline curve and the cubic spline curve that are included in the modified spline curve are related to the mode indication value. Alternatively, obtaining of a parameter of a modified spline curve in a specific case in the foregoing Case 1, Case 2, Case 3.1, Case 3.2, and Case 3.3 is determined based on the mode indication value.

FIG. 6a is a schematic flowchart of a method for obtaining a parameter of a modified spline curve according to an embodiment of this application. The schematic flowchart of the method in FIG. 6a shows obtaining of a parameter of a modified spline curve in the first scene mode and Case 3.1. In this case, the modified spline curve includes one linear spline curve, namely, a first spline curve, and two cubic spline curves: a second spline curve and a third spline curve.

601. Obtain a first coordinate TH1 of a first interpolation point and a first-order derivative MB0 of the first spline curve:

$$TH1 = \begin{cases} p_{valueL} & \\ p_{valueL} \times \left(\frac{(maxL - TPL)}{TPH - TPL}\right) + p_{valueH} & \\ p_{valueH} & \end{cases} \quad (14)$$

$$\begin{array}{l} maxL > TPH \\ \left(1 - \left(\frac{(maxL - TPL)}{TPH - TPL}\right)\right) \quad TPL \le maxL \le TPH \\ maxL < TPL \end{array}$$

$$MB0 = \begin{cases} S_{valueL} & \\ S_{valueL} \times \left(\frac{(avgL - AvL)}{AvH - AvL}\right) + S_{valueH} \times & \\ S_{valueH} & \end{cases} \quad (15)$$

$$\begin{array}{l} aveL > AvH \\ \left(1 - \left(\frac{(avgL - AvL)}{AvH - AvL}\right)\right) \quad AvL \le avgL \le AvH \\ aveL > AvL \end{array}$$

where maxL and avgL are included in dynamic metadata, maxL is a maximum luminance value of a to-be-processed image, and avgL is an average luminance value of the to-be-processed image. When the to-be-processed image is received, the first coordinate TH1 of the first interpolation point is calculated based on maxL included in the dynamic metadata of the to-be-processed image and Formula (14), and a slope MB0 of the first spline curve is calculated based on avgL included in the dynamic metadata and Formula (15). The first spline curve is, for example, the curve shown by Formula (1). In an optional case, the first coordinate of the first interpolation point may be calculated based on the average luminance value avgL of the to-be-processed image. Correspondingly, maxL in Formula (14) may be replaced with avgL. In another optional case, the first coordinate of the first interpolation point may be calculated based on the maximum luminance value maxL of the to-be-processed image and the average luminance value avgL of the to-be-processed image. Correspondingly, maxL in Formula (14) is replaced with a*maxL+b*avgL, where a and b are both constants, $0 \le a \le 1$, and $0 \le b \le 1$.

Correspondingly, in an optional case, the first-order derivative MB0 of the first spline curve may be calculated based on the maximum luminance value maxL of the to-be-processed image. Correspondingly, avgL in Formula (15) may be replaced with maxL. In another optional case, the first coordinate of the first interpolation point may be calculated based on the maximum luminance value maxL of the to-be-processed image and the average luminance value avgL of the to-be-processed image. Correspondingly, avgL in Formula (15) is replaced with a*maxL+b*avgL, where a and b are both constants, $0 \le a \le 1$, and $0 \le b \le 1$.

PvalueL is a first threshold of a dark-region pixel, PvalueH is a second threshold of the dark-region pixel, and the first threshold is less than the second threshold. For example, a value of PvalueL may be 0.15, and a value of PvalueH may be 0.25. TPH is a third threshold of a bright-region pixel, and TPL is a fourth threshold of the bright-region pixel. For example, a value of TPH may be 0.6, and a value of TPL may be 0.1. AvL is a fifth threshold of an average pixel, and AvH is a sixth threshold of the average pixel. For example, a value of AvL may be 0.15, and a value of AvH may be 0.65. SvalueL is a first slope threshold added to the luminance value of the dark-region pixel, SvalueH is a second slope threshold added to the luminance value of the dark-region pixel, and the first slope threshold is less than the second slope threshold. For example, a value of SvalueL may be 1, and a value of SvalueH may be 1.2.

602. Obtain first coordinates TH2 and TH3 of a second interpolation point and a third interpolation point:

$$TH2 = TH1 + B \quad (16)$$

$$TH3 = TH2 + C*TH2 - D*TH2 \quad (17)$$

B is a first offset value of a pixel in a dark-region transition region, C is a second offset value of the bright-region pixel, D is a third offset value of the bright-region pixel, and B, C, and D are constants. In an optional case, the dynamic metadata includes the foregoing B, C, and D, or B, C, and D may be directly defined in related program code, and do not need to be obtained from the dynamic metadata. For example, B may be 0.15, and C and D may be 0.5.

603. Determine four coefficients MA1, MB1, MC1, and MD1 of the second spline curve and four coefficients MA2, MB2, MC2, and MD2 of the third spline curve based on TH1, TH2, and TH3.

It should be understood that in this case, the modified spline curve includes two cubic spline curves: the second spline curve and the third spline curve. In an optional case, the modified spline curve may include only one cubic spline curve.

Specifically, as shown in FIG. 6b, step 603 includes:

6031. Respectively calculate second coordinates VA1, VA2, and VA3 of the first interpolation point, the second interpolation point, and the third interpolation point.

Specifically, step 6031 includes:
(1) Calculate the second coordinate VA1 of the first interpolation point on the linear spline curve:

$$VA1 = MB0 \times TH1 \quad (17)$$

(2) Calculate the second coordinate VA3 of the third interpolation point on an initial tone mapping curve.

For example, as shown in Formula (18), it is assumed that the initial tone mapping curve is an SLF tone mapping curve:

$$F(L) = a \times \left( \frac{p \times L^n}{(k_1 \times p - k_2) \times L^n + k_3} \right)^m + b \quad (18)$$

In this case, TH3 is substituted into Formula (18) to obtain VA3=F(TH3). It should be understood that p, m, n, a, b, $k_1$, $k_2$, and $k_3$ in Formula (18) are all constants. A parameter of the initial tone mapping curve may be obtained from the dynamic metadata, or may be calculated in advance based on the to-be-processed image.
(3) Calculate the second coordinate VA2 of the second interpolation point on a first straight line, where the first straight line is a straight line on which the first interpolation point and the third interpolation point are located:

$$VA2 = TH2 \times \left( \frac{VA3 - TH1}{TH3 - TH1} \right) + TH1 \times \left( \frac{TH3 - VA3}{TH3 - TH1} \right) \quad (19)$$

6032. Determine VA1 as the first coefficient MA1 of the second spline curve, and determine a sum of VA2 and an offset value as the first coefficient MA2 of the third spline curve. Optionally, the offset value may be 0, a positive number, or a negative number. The offset value may be obtained from the dynamic metadata, or may be defined in related program code of a spline curve parameter obtaining process.

6033. Determine the first-order derivative MB0 of the first spline curve as the second coefficient MB1 of the second spline curve.

6034. Calculate a first-order derivative GD3 of the initial tone mapping curve at the third interpolation point:

$$GD3 = a \times m \times p \times k_3 \times n \times TH3^{n-1} \times \left( \frac{p \times TH3^n}{(k_1 \times p - k_2) \times TH3^n + k_3} \right)^{m+1} \times \left( \frac{1}{TH3^n \times p} \right)^2 \quad (20)$$

6035. Construct a system of equations based on TH1, TH2, TH3, VA2, VA3, GD3, and a derivative relationship between the second spline curve and the third spline curve at the second interpolation point.

For example, the system of equations includes a first equation, a second equation, a third equation, a fourth equation, and a fifth equation. Step 6035 specifically includes:
(1) Enable a second coordinate of the second interpolation point on the second spline curve to be VA2. In an optional case, VA2=Formula (19)+offset value, to obtain the first equation shown by Formula (21):

$$MD1 \times (TH2-TH1)^3 + MC1 \times (TH2-TH1)^2 + MB1 \times (TH2-TH1)^1 + MA1 = VA2 \quad (21)$$

(2) Enable a second coordinate of the third interpolation point on the third spline curve to be VA3, to obtain the second equation shown by Formula (22):

$$MD2 \times (TH3-TH1)^3 + MC2 \times (TH3-TH1)^2 + MB2 \times (TH3-TH1)^1 + MA2 = VA3 \quad (22)$$

(3) Enable a first-order derivative of the third spline curve at the third interpolation point to be GD3, to obtain the third equation shown by Formula (23):

$$3 \times MD2 \times (TH3-TH2)^2 + 2 \times MC2 \times (TH3-TH2)^1 + MB2 = GD3 \quad (23)$$

(4) Enable first-order derivatives of the second spline curve and the third spline curve at the second interpolation point to be equal, to obtain the fourth equation shown by Formula (24):

$$3 \times MD1 \times (TH2-TH1)^2 + 2 \times MC1 \times (TH2-TH1)^1 + MB1 = 3 \times MD2 \times (TH2-TH2)^2 + 2 \times MC2 \times (TH2-TH2)^1 + MB2 \quad (24)$$

(5) Enable second-order derivatives of the second spline curve and the third spline curve at the second interpolation point to be equal, to obtain the fifth equation shown by Formula (25):

$$6 \times MD1 \times (TH2-TH1)^1 + 2 \times MC1 = 6 \times MD2 \times (TH2-TH2)^1 + 2 \times MC2 \quad (25)$$

6036. Solve the system of equations that includes the first equation, the second equation, the third equation, the fourth equation, and the fifth equation, to obtain MC1, MD1, MB2, MC2, and MD2:

$$MC1 = (3*VA2 - 2*GD1*h1 - 3*VA1 - MB2*h1)/h1*h1 \quad (26)$$

$$MD1 = (h1*GD1 + h1*MB2 + 2*VA1 - 2*VA2)/(h1*h1*h1) \quad (27)$$

$$MB2 = -(3*VA1 h2*h3*VA2*h1*h1 - 3*VA3*h1*h1 - 3*VA2*h2*h2*VA2 + h1*h1*h2*GD3 + GD1*h1*h2*h2)/(2*h2*(h1*h1 + h2*h1)) \quad (28)$$

$$MC2 = MC1 + 3*MD1*h1 \quad (29)$$

$$MD2 = -(VA3 - VA2 - h2*GD3 + MC1]*h2*h2 + 3*MD1*h1*h2*h2)/(2*h2*h2*h2) \quad (30)$$

where h1=TH2−TH1, and h2=TH3−TH2.

604. Determine the second spline curve based on MA1, MB1, MC1, and MD1, and determine the third spline curve based on MA2, MB2, MC2, and MD2.

Specifically, the second spline curve is shown by Formula (2), and the third spline curve is shown by Formula (3).

It should be understood that, for ease of description, the method is described in a form of a step in FIG. 6a and FIG. 6b. Although a sequence of the method is shown in the method flowchart, in some cases, the described steps may be performed in a sequence different from the sequence herein.

FIG. 7 is a schematic flowchart of a method for obtaining a parameter of a modified spline curve according to an embodiment of this application. The schematic flowchart of the method in FIG. 7 shows obtaining of a parameter of a modified spline curve in the second scene mode. In this case, the modified spline curve includes two cubic spline curves: a first spline curve and a second spline curve. In an optional case, the modified spline curve may include only one cubic spline curve. Correspondingly, only two interpolation points need to be determined.

The method includes:

701. Obtain first coordinates TH1, TH2, and TH3 of a first interpolation point, a second interpolation point, and a third interpolation point.

For example, TH1=A, TH2=B, and TH3=C, where A, B, and C are all constants. It is assumed that A and B constitute a first adjustment range, B and C constitute a second adjustment range, A is a minimum value of a luminance value of a pixel in the first adjustment range, B is a maximum value of the luminance value of the pixel in the first adjustment range, and C is a maximum value of a luminance value of a pixel in the second adjustment range. In this case, A<B<C.

In an optional case, A, B, and C may be obtained based on dynamic metadata. For example, the dynamic metadata includes a start location L1 and an end location L3 of a range of the modified spline curve. In this case, the foregoing A, B, and C may be calculated based on data information in the dynamic metadata:

$$A=L1/255, \ C=L3/255, \ B=(A+C)/2$$

In an optional case, the dynamic metadata directly carries the foregoing A, B, and C.

In an optional case, A, B, and C may be calculated by using a formula similar to Formula (14).

702. Respectively calculate second coordinates VA1 and VA3 of the first interpolation point and the third interpolation point on an initial tone mapping curve.

For example, the initial tone mapping curve is shown by the foregoing Formula (18), TH1 is substituted into Formula (18) to obtain VA1, and TH3 is substituted into Formula (18) to obtain VA3:

$$VA1 = a \times \left( \frac{p \times TH1^n}{(k_1 \times p - k_2) \times TH1^n + k_3} \right)^m + b \tag{31}$$

$$VA3 = a \times \left( \frac{p \times TH3^n}{(k_1 \times p - k_2) \times TH3^n + k_3} \right)^m + b \tag{32}$$

703. Calculate a second coordinate VA2 of the second interpolation point on a first straight line, where the first straight line is a straight line on which the first interpolation point and the third interpolation point are located.

In an optional case, a formula for calculating VA2 is the same as Formula (19).

In an optional case, the dynamic metadata includes a coordinate offset value Spline_strength. It should be understood that the coordinate offset value may be a positive number, a negative number, or 0. In this case, VA2 is a sum of the second coordinate of the second interpolation point on the first straight line and the coordinate offset value carried in the dynamic metadata:

$$VA2 = TH2 \times \left( \frac{VA3 - TH1}{TH3 - TH1} \right) + TH1 \times \left( \frac{TH3 - VA3}{TH3 - TH1} \right) + \text{Spline\_strength} \tag{33}$$

704. Determine VA1 as a first coefficient MA1 of the first spline curve, and determine VA2 as a first coefficient MA2 of the second spline curve.

705. Calculate a first-order derivative GD1 of the initial tone mapping curve at the first interpolation point and a first-order derivative GD3 of the initial tone mapping curve at the third interpolation point, and determine GD1 as a second coefficient MB1 of the first spline curve:

$$GD1 = a \times m \times p \times k_3 \times n \times TH1^{n-1} \times \tag{34}$$

$$\left( \frac{p \times TH1^n}{(k_1 \times p - k_2) \times TH1^n + k_3} \right)^{m+1} \times \left( \frac{1}{TH1^n \times p} \right)^2$$

A formula for calculating GD3 is the same as Formula (20).

706. Construct a system of equations based on TH1, TH2, TH3, VA2, VA3, GD3, and a derivative relationship between the first spline curve and the second spline curve at the second interpolation point, where the system of equations includes five equations.

For example, step 706 specifically includes:
(1) Enable a second coordinate of the second interpolation point on the first spline curve to be VA2, to obtain a first equation, where the first equation is shown by Formula (21).
(2) Enable a second coordinate of the third interpolation point on the second spline curve to be VA3, to obtain a second equation shown by Formula (22).
(3) Enable a first-order derivative of the second spline curve at the third interpolation point to be GD3, to obtain a third equation shown by Formula (23).
(4) Enable first-order derivatives of the first spline curve and the second spline curve at the second interpolation point to be equal, to obtain a fourth equation shown by Formula (24).
(5) Enable second-order derivatives of the first spline curve and the second spline curve at the second interpolation point to be equal, to obtain a fifth equation shown by Formula (25).

707. Solve the system of equations that includes the first equation, the second equation, the third equation, the fourth equation, and the fifth equation, to obtain MC1, MD1, MB2, MC2, and MD2.

For a calculation result, refer to Formula (26) to Formula (30). Details are not described herein again.

708. Determine the first spline curve based on MA1, MB1, MC1, and MD1, and determine the second spline curve based on MA2, MB2, MC2, and MD2.

The first spline curve is: $F(L)=MD1\times(L-TH1)^3+ MC1\times(L-TH1)^2+MB1\times(L-TH1)^1+MA1$ (35)

The second spline curve is: $F(L)=MD2\times(L-TH2)^3+ MC2\times(L-TH2)^2+MB2\times(L-TH2)^1+MA2$ (36)

In this scenario, the first coordinates of the first interpolation point, the second interpolation point, and the third interpolation point are obtained based on the dynamic metadata, and both the first interpolation point and the third interpolation point are located on the initial tone mapping curve. The dynamic metadata may further include a vertical coordinate offset value of the second interpolation point, and the vertical coordinate offset value is used to indicate an offset value, of the second interpolation point, that is relative to a straight line defined by the first interpolation point and the third interpolation point and that is in a vertical coordinate direction.

FIG. 8 is a schematic flowchart of a method for obtaining a parameter of a modified spline curve according to an embodiment of this application. The schematic flowchart of the method in FIG. 8 shows obtaining of a parameter of a modified spline curve in the third scene mode. In this case, the modified spline curve includes one linear spline curve: a first spline curve. A parameter that needs to be determined includes a first coordinate TH1 of a first interpolation point, and a first coefficient MA0 and a second coefficient MB0 of the first spline curve.

The method includes:

801. Obtain the first coordinate TH1 of the first interpolation point.

In an optional solution, TH1=A.

Optionally, A may be a constant carried in dynamic metadata, or A may be calculated based on data carried in dynamic metadata. For example, if the dynamic metadata carries a start value L1 of a modified range, A=L1/255.

In an optional solution, TH1 may be calculated based on feature information of a picture and a piecewise formula similar to Formula (14).

802. Calculate a second coordinate VA1 of the first interpolation point on an initial tone mapping curve.

The initial tone mapping curve is shown by Formula (18), and TH1 is substituted into Formula (18) to obtain VA1:

$$VA1 = a \times \left( \frac{p \times TH1^n}{(k_1 \times p - k_2) \times TH1^n + k_3} \right)^m + b \qquad (37)$$

803. Calculate a first-order derivative GD1 of the initial tone mapping curve at the first interpolation point:

$$GD1 = a \times m \times p \times k_3 \times n \times TH1^{n-1} \times \qquad (38)$$
$$\left( \frac{p \times TH1^n}{(k_1 \times p - k_2) \times TH1]^n + k_3} \right)^{m+1} \times \left( \frac{1}{TH1^n \times p} \right)^2$$

804. Determine GD1 as the second coefficient MB0 of the first spline curve, and determine VA1 as the first coefficient MA0 of the first spline curve.

Correspondingly, the obtained modified spline curve is shown by Formula (6).

FIG. 9 is a schematic flowchart of a method for obtaining a parameter of a modified spline curve according to an embodiment of this application. The schematic flowchart of the method in FIG. 9 shows obtaining of a parameter of a modified spline curve in the fourth scene mode. In this case, the modified spline curve includes one cubic spline curve: a first spline curve.

The method includes:

901. Obtain first coordinates TH1 and TH2 of a first interpolation point and a second interpolation point based on dynamic metadata.

For example, TH1=A, and TH2=B, where A and B are constants. For example, B may be 1.0.

In an optional case, A and B may be directly obtained from the dynamic metadata. In an optional case, A and B may be calculated based on data information carried in the dynamic metadata. Alternatively, A and B may be calculated based on a feature of a to-be-processed image and a piecewise formula similar to Formula (14).

902. Respectively calculate second coordinates VA1 and VA2 of the first interpolation point and the second interpolation point on an initial tone mapping curve.

For example, the initial tone mapping curve is shown by the foregoing Formula (18), TH1 is substituted into Formula (18) to obtain VA1, and TH2 is substituted into Formula (18) to obtain VA2:

$$VA1 = a \times \left( \frac{p \times TH1^n}{(k_1 \times p - k_2) \times TH1^n + k_3} \right)^m + b \qquad (39)$$

$$VA2 = a \times \left( \frac{p \times TH2^n}{(k_1 \times p - k_2) \times TH2^n + k_3} \right)^m + b \qquad (40)$$

903. Calculate a first-order derivative GD1 of the initial tone mapping curve at the first interpolation point and a first-order derivative GD2 of the initial tone mapping curve at the second interpolation point:

$$GD1 = a \times m \times p \times k_3 \times n \times TH1^{n-1} \times \qquad (41)$$
$$\left( \frac{p \times TH1^n}{(k_1 \times p - k_2) \times TH1]^n + k_3} \right)^{m+1} \times \left( \frac{1}{TH1^n \times p} \right)^2$$

$$GD2 = a \times m \times p \times k_3 \times n \times TH2^{n-1} \times \qquad (42)$$
$$\left( \frac{p \times TH2^n}{(k_1 \times p - k_2) \times TH2]^n + k_3} \right)^{m+1} \times \left( \frac{1}{TH2^n \times p} \right)^2$$

904. Determine VA1 as a first coefficient MA1 of the first spline curve, and determine GD1 as a second coefficient MB1 of the first spline curve.

905. Construct a system of equations based on TH1, TH2, VA2, and GD2.

For example, step 905 specifically includes:

(1) Enable a second coordinate of the second interpolation point on the first spline curve to be VA2'=VA2+S1, to obtain a first equation shown by Formula (43):

$$MD1 \times (TH2-TH1)^3 + MC1 \times (TH2-TH1)^2 + MB1 \times (TH2-TH1)^1 + MA1 = VA2 + S1 \qquad (43)$$

S1 is a coordinate offset value included in the dynamic metadata. Optionally, S1 may be a positive value, a negative value, or 0.

(2) Enable a first-order derivative of the first spline curve at the second interpolation point to be GD2'=GD2+S2, to obtain a second equation shown by Formula (44):

$$3 \times MD1 \times (TH2-TH1)^2 + 2 \times MC1 \times (TH2-TH1)^1 + MB1 = GD2 + S2 \qquad (44)$$

S2 is a slope offset value included in the dynamic metadata. Optionally, S2 may be a positive value, a negative value, or 0.

906. Solve the system of equations that includes the first equation and the second equation, to obtain MC1 and MD1.

Correspondingly, the obtained modified spline curve is shown by Formula (45):

$$F(L) = MD1 \times (L-TH1)^3 + MC1 \times (L-TH1)^2 + MB1 \times (L-TH1)^1 + MA1 \qquad (45)$$

FIG. 10 is a schematic flowchart of a method for obtaining a parameter of a modified spline curve according to an embodiment of this application. The schematic flowchart of the method in FIG. 10 shows obtaining of a parameter of a modified spline curve in the fifth scene mode. In this case, the modified spline curve includes one cubic spline curve and one linear spline curve. A parameter of the modified spline curve includes: four coefficients MA1, MB1, MC1, and MD1 of a first spline curve, and two coefficients MA2 and MB2 of a second spline curve.

The method includes:

1001. Obtain first coordinates TH1, TH2, and TH3 of a first interpolation point, a second interpolation point, and a third interpolation point.

For example, TH1=A, TH2=B, and TH3=C, where A, B, and C are all constants. It is assumed that A and B constitute a first adjustment range, B and C constitute a second adjustment range, A is a minimum value of a luminance value of a pixel in the first adjustment range, B is a maximum value of the luminance value of the pixel in the first adjustment range or a minimum value of a luminance value of a pixel in the second adjustment range, and C is a maximum value of the luminance value of the pixel in the second adjustment range. In this case, A<B<C.

In an optional case, A, B, and C may be obtained based on dynamic metadata. For example, the dynamic metadata includes a start location L1 and an end location L3 of a range of the modified spline curve. In this case, the foregoing A, B, and C may be calculated based on data information in the dynamic metadata:

$A=L1/255$, $C=L3/255$, $B=(A+C)/2$

In an optional case, the dynamic metadata directly carries the foregoing A, B, and C.

In an optional case, A, B, and C may be calculated by using a formula similar to Formula (14).

1002. Respectively calculate second coordinates VA1 and VA3 of the first interpolation point and the third interpolation point on an initial tone mapping curve.

For details, refer to the descriptions in the part of step 702. Details are not described herein again.

1003. Calculate a second coordinate VA2 of the second interpolation point on a first straight line, where the first straight line is a straight line on which the first interpolation point (TH1, VA1) and the third interpolation point (TH3, VA3) are located.

In an optional case, a formula for calculating VA2 is the same as Formula (19).

In an optional case, the dynamic metadata includes a coordinate offset value Spline_strength. It should be understood that the coordinate offset value may be a positive number, a negative number, or 0. When Spline_strength is 0, a value of VA2 may be calculated based on Formula (19). In this case, VA2 is a sum of the second coordinate of the second interpolation point on the first straight line and the coordinate offset value carried in the dynamic metadata:

$$VA2 = TH2 \times \left(\frac{VA3 - TH1}{TH3 - TH1}\right) + TH1 \times \left(\frac{TH3 - VA3}{TH3 - TH1}\right) + \text{Spline\_strength} \quad (46)$$

It should be understood that VA1<VA2<VA3.

1004. Determine VA1 as the first coefficient MA1 of the first spline curve, and determine VA2 as the first coefficient MA2 of the second spline curve.

1005. Calculate a first-order derivative GD1 of the initial tone mapping curve at the first interpolation point and a first-order derivative GD3 of the initial tone mapping curve at the third interpolation point, and determine GD1 as the second coefficient MB1 of the first spline curve:

$$GD1 = a \times m \times p \times k_3 \times n \times TH1^{n-1} \times \left(\frac{p \times TH1^n}{(k_1 \times p - k_2) \times TH1^n + k_3}\right)^{m+1} \times \left(\frac{1}{TH1^n \times p}\right)^2 \quad (47)$$

$$GD3 = a \times m \times p \times k_3 \times n \times TH3^{n-1} \times \left(\frac{p \times TH3^n}{(k_1 \times p - k_2) \times TH3^n + k_3}\right)^{m+1} \times \left(\frac{1}{TH3^n \times p}\right)^2 \quad (48)$$

1006. Construct a system of equations based on TH1, TH2, TH3, VA2, VA3, and a derivative relationship between the first spline curve and the second spline curve at the second interpolation point.

For example, step 1006 specifically includes:

(1) Enable a second coordinate of the second interpolation point on the first spline curve to be VA2, to obtain a first equation shown by Formula (49):

$$MD1 \times (TH2-TH1)^3 + MC1 \times (TH2-TH1)^2 + MB1 \times (TH2-TH1)^1 + MA1 = VA2 \quad (49)$$

(2) Enable a second coordinate of the third interpolation point on the second spline curve to be VA3, to obtain a second equation shown by Formula (50):

$$MB2 \times (TH3-TH2)^1 + MA2 = VA3 \quad (50)$$

(3) Enable first-order derivatives of the first spline curve and the second spline curve at the second interpolation point to be equal, to obtain a third equation shown by Formula (51):

$$3 \times MD1 \times (TH2-TH1)^2 + 2 \times MC1 \times (TH2-TH1)^1 + MB1 = MB2 \quad (51)$$

1007. Solve the system of equations that includes the first equation, the second equation, and the third equation, to obtain MC1, MD1, and MB2.

The obtained modified spline curve is shown by Formula (52) and Formula (53), where Formula (52) is the first spline curve, and Formula (53) is the second spline curve:

$$F(L) = MD1 \times (L-TH1)^3 + MC1 \times (L-TH1)^2 + MB1 \times (L-TH1)^1 + MA1 \quad (52)$$

$$F(L) = MB2 \times (L-TH2)^1 + MA2 \quad (53)$$

It should be understood that, for ease of description, the method is described in a form of a step in the method flowcharts shown in FIG. 7 to FIG. 10. Although a sequence of the method is shown, in some cases, the described steps may be performed in a sequence different from the sequence herein.

Figure 11:
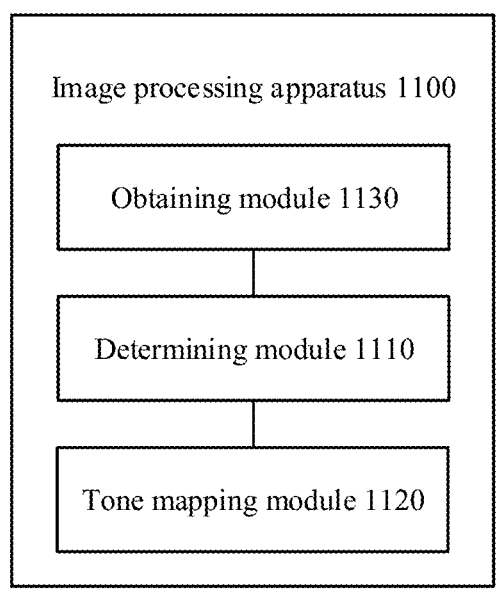
FIG. 11 is a structural block diagram of an exemplary image processing apparatus according to an embodiment of this application.

FIG. 11 is a structural block diagram of an exemplary image processing apparatus 1100 according to an embodiment of this application. The image processing apparatus 1100 includes:

a determining module 1110, configured to perform steps 301, 302, 501, 502, and 503 in the method embodiments; and a tone mapping module 1120, configured to perform steps 303 and 504 in the method embodiments.

Specifically, the determining module 1110 is further configured to perform some or all of the steps in the method embodiments shown in FIG. 6a, FIG. 6b, and FIG. 7 to FIG. 10.

In an optional case, the image processing apparatus 1100 further includes an obtaining module 1130, configured to obtain a to-be-processed image and corresponding dynamic metadata.

It should be understood that the image processing device 14 shown in FIG. 1 and the image processing apparatus shown in FIG. 2 may be configured to implement any one of the method embodiments provided in FIG. 3, FIG. 5, FIG. 6a, FIG. 6b, and FIG. 7 to FIG. 10 in embodiments of this application. Specifically, the image processing device 14 and the processor in FIG. 2 invoke program instructions stored in a memory, to perform some or all of the steps in the method in any one of embodiments in FIG. 3, FIG. 5, FIG. 6a, FIG. 6b, and FIG. 7 to FIG. 10.

An embodiment of this application further provides a computer-readable storage medium. The computer-readable storage medium stores instructions. When the computer-readable storage medium is run on a computer or a processor, the computer or the processor is enabled to perform one or more steps in any one of the foregoing methods. When the modules in the foregoing image processing apparatus are implemented in the form of a software functional unit and sold or used as an independent product, the unit may be stored in the computer-readable storage medium.

Based on such an understanding, an embodiment of this application further provides a computer program product including instructions. When the computer program product runs on a computer or a processor, the computer or the processor is enabled to perform any method provided in embodiments of this application. The technical solutions of this application essentially, or the part contributing to the conventional technology, or all or some of the technical solutions may be implemented in a form of a software product. The computer software product is stored in a storage medium, and includes several instructions for instructing a computer device or a processor in a computer device to perform all or some of the steps of the methods in embodiments of this application.

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. An image processing method, comprising:
   determining a first coordinate of at least one interpolation point based on feature information or dynamic metadata of a to-be-processed image;
   determining at least one second coordinate and at least one first-order derivative corresponding to the first coordinate of the at least one interpolation point;
   determining coefficients of a modified spline curve based on the first coordinate of the at least one interpolation point, the at least one second coordinate, and the at least one first-order derivative, wherein the modified spline curve comprises at least one of a linear spline curve or a cubic spline curve; and
   performing tone mapping on the to-be-processed image based on a modified tone mapping curve, wherein the modified tone mapping curve comprises at least a part of an initial tone mapping curve and the modified spline curve;
   wherein the at least one interpolation point comprises a first interpolation point, the modified spline curve comprises a first spline curve, the first spline curve is a linear spline function that passes through an origin and the first interpolation point, and the coefficients of the modified spline curve comprise a first-order derivative MB0 of the first spline curve;
   before the determining of the at least one second coordinate and the at least one first-order derivative based on the first coordinate of the at least one interpolation point, the method further comprises:
   obtaining the first-order derivative MB0 of the first spline curve based on at least one of a maximum value maxL of luminance of the to-be-processed image and an average value avgL of luminance of the to-be-processed image that are comprised in the dynamic metadata; and
   wherein the at least one interpolation point further comprises a second interpolation point and a third interpolation point, the modified spline curve further comprises a second spline curve and a third spline curve, the second spline curve is a cubic spline curve that passes through the first interpolation point and the second interpolation point, the third spline curve is a cubic spline curve that passes through the second interpolation point and the third interpolation point, and the coefficients of the modified spline curve further comprise: MA1, MB1, MC1, MD1, MA2, MB2, MC2 and MD2; and wherein the MA1, MB1, MC1, and MD1 are coefficients of the first spline curve and the MA2, MB2, MC2, and MD2 are coefficients of the second spline curve;
   the determining of the at least one second coordinate and the at least one first-order derivative based on the first coordinate of the at least one interpolation point comprises:
   calculating a second coordinate VA1 of the first interpolation point on the first spline curve based on a first coordinate TH1 of the first interpolation point and the first-order derivative MB0;
   calculating a second coordinate VA3 of the third interpolation point on the initial tone mapping curve based on a first coordinate TH3 of the third interpolation point;
   calculating a second coordinate VA2 of the second interpolation point on a first straight line based on a first coordinate TH2 of the second interpolation point, wherein the first straight line includes the first interpolation point and the third interpolation point; and
   calculating a first-order derivative GD3 of the initial tone mapping curve at the third interpolation point based on TH3; and
   wherein the determining of the coefficients of the modified spline curve based on the first coordinate of the at least one interpolation point, the at least one second coordinate, and the at least one first-order derivative comprises:
   determining VA1 as MA1;
   determining the first-order derivative MB0 as MB1;
   determining a sum of VA2 and an offset value as MA2, wherein the offset value is 0, a positive number, or a negative number; and
   obtaining MC1, MD1, MB2, MC2, and MD2 based on TH1, TH2, TH3, VA2, VA3, and GD3;
   wherein the coefficients MC1, MD1, MB2, MC2, and MD2 are determined together.

2. The method according to claim 1, wherein the obtained MC1, MD1, MB2, MC2, and MD2 based on TH1, TH2, TH3, VA2, VA3, GD3 are:

$$MC1=(3*VA2-2*GD1*h1-3*VA1-MB2*h1)/h1*h1;$$

$$MD1=(h1*GD1+h1*MB2+2*VA1-2*VA2)/(h1*h1*h1);$$

$$MB2=-(3*VA1*h2*h2+3*VA2*h1*h1-\\3*VA3*h1*h1-3*VA2*h2*h2*VA2+\\h1*h1*h2*GD3+GD1*h1*h2*h2)/(2*h2*\\(h1*h1+h2*h1));$$

$$MD2=-(VA3-VA2-h2*GD3+MC1*h2*h2+\\3*MD1*h1*h2*h2)/(2*h2*h2*h2);$$

wherein GD1 is a first-order derivative of the initial tone mapping cure at the first interpolation point, h1=TH2−TH1, and h2=TH3−TH2.

3. The method according to claim 1, wherein before determining the first coordinate of at least one interpolation point based on feature information or dynamic metadata of the to-be-processed image, the method further comprises:
determining a target scene mode applicable to the to-be-processed image based on a mode indication value in the dynamic metadata, wherein the at least one interpolation point and the modified spline curve are related to the target scene mode.

4. An image processing apparatus, comprising a processor and a transmission interface, wherein
the transmission interface is configured to receive or send image data; and
the processor is configured to: invoke program instructions stored in a memory, and execute the program instructions to perform:
determining a first coordinate of at least one interpolation point based on feature information or dynamic metadata of a to-be-processed image;
determining at least one second coordinate and at least one first-order derivative corresponding to the first coordinate of the at least one interpolation point;
determining coefficients of a modified spline curve, wherein the modified spline curve comprises at least one of a linear spline curve or a cubic spline curve; and
performing tone mapping on the to-be-processed image based on a modified tone mapping curve, wherein the modified tone mapping curve comprises at least a part of an initial tone mapping curve and the modified spline curve;
wherein the at least one interpolation point comprises a first interpolation point, the modified spline curve comprises a first spline curve, the first spline curve is a linear spline function that passes through an origin and the first interpolation point, and the coefficients of the modified spline curve comprise a first-order derivative MB0 of the first spline curve;
before the determining of the at least one second coordinate and the at least one first-order derivative based on the first coordinate of the at least one interpolation point, the method further comprises:
obtaining the first-order derivative MB0 of the first spline curve based on at least one of a maximum value maxL of luminance of the to-be-processed image and an average value avgL of luminance of the to-be-processed image that are comprised in the dynamic metadata; and
wherein the at least one interpolation point further comprises a second interpolation point and a third interpolation point, the modified spline curve further comprises a second spline curve and a third spline curve, the second spline curve is a cubic spline curve that passes through the first interpolation point and the second interpolation point, the third spline curve is a cubic spline curve that passes through the second interpolation point and the third interpolation point, and the coefficients of the modified spline curve further comprise: MA1, MB1, MC1, MD1, MA2, MB2, MC2 and MD2, and wherein the MA1, MB1, MC1, and MD1 are coefficients of the first spline curve and the MA2, MB2, MC2, and MD2 are coefficients of the second spline curve;
the determining of the at least one second coordinate and the at least one first-order derivative based on the first coordinate of the at least one interpolation point comprises:
calculating a second coordinate VA1 of the first interpolation point on the first spline curve based on a first coordinate TH1 of the first interpolation point and the first-order derivative MB0;
calculating a second coordinate VA3 of the third interpolation point on the initial tone mapping curve based on a first coordinate TH3 of the third interpolation point;
calculating a second coordinate VA2 of the second interpolation point on a first straight line based on a first coordinate TH2 of the second interpolation point, wherein the first straight line includes the first interpolation point and the third interpolation point; and
calculating a first-order derivative GD3 of the initial tone mapping curve at the third interpolation point based on TH3; and
wherein the determining of the coefficients of the modified spline curve based on the first coordinate of the at least one interpolation point, the at least one second coordinate, and the at least one first-order derivative comprises:
determining VA1 as MA1;
determining the first-order derivative MB0 as MB1;
determining a sum of VA2 and an offset value as MA2, wherein the offset value is 0, a positive number, or a negative number; and
obtaining MC1, MD1, MB2, MC2, and MD2 based on TH1, TH2, TH3, VA2, VA3, and GD3;
wherein the coefficients MC1, MD1, MB2, MC2, and MD2 are determined together.

5. A non-transitory computer-readable storage medium, wherein the non-transitory computer-readable storage medium stores instructions; and when the instructions are run on a computer or a processor, the computer or the processor is enabled to perform:
determining a first coordinate of at least one interpolation point based on feature information or dynamic metadata of a to-be-processed image;
determining at least one second coordinate and at least one first-order derivative corresponding to the first coordinate of the at least one interpolation point;
determining coefficients of a modified spline curve, wherein the modified spline curve comprises at least one of a linear spline curve or a cubic spline curve; and
performing tone mapping on the to-be-processed image based on a modified tone mapping curve, wherein the modified tone mapping curve comprises at least a part of an initial tone mapping curve and the modified spline curve;
wherein the at least one interpolation point comprises a first interpolation point, the modified spline curve comprises a first spline curve, the first spline curve is a linear spline function that passes through an origin and the first interpolation point, and the coefficients of the modified spline curve comprise a first-order derivative MB0 of the first spline curve;
before the determining of the at least one second coordinate and the at least one first-order derivative based on the first coordinate of the at least one interpolation point, the method further comprises:

obtaining the first-order derivative MB0 of the first spline curve based on at least one of a maximum value maxL of luminance of the to-be-processed image and an average value avgL of luminance of the to-be-processed image that are comprised in the dynamic metadata; and wherein the at least one interpolation point further comprises a second interpolation point and a third interpolation point, the modified spline curve further comprises a second spline curve and a third spline curve, the second spline curve is a cubic spline curve that passes through the first interpolation point and the second interpolation point, the third spline curve is a cubic spline curve that passes through the second interpolation point and the third interpolation point, and the coefficients of the modified spline curve further comprise: MA1, MB1, MC1, MD1, MA2, MB2, MC2 and MD2, and wherein the MA1, MB1, MC1, and MD1 are coefficients of the first spline curve and the MA2, MB2, MC2, and MD2 are coefficients of the second spline curve;

the determining of the at least one second coordinate and the at least one first-order derivative based on the first coordinate of the at least one interpolation point comprises:

calculating a second coordinate VA1 of the first interpolation point on the first spline curve based on a first coordinate TH1 of the first interpolation point and the first-order derivative MB0;

calculating a second coordinate VA3 of the third interpolation point on the initial tone mapping curve based on a first coordinate TH3 of the third interpolation point;

calculating a second coordinate VA2 of the second interpolation point on a first straight line based on a first coordinate TH2 of the second interpolation point, wherein the first straight line includes the first interpolation point and the third interpolation point; and calculating a first-order derivative GD3 of the initial tone mapping curve at the third interpolation point based on TH3; and wherein the determining of the coefficients of the modified spline curve based on the first coordinate of the at least one interpolation point, the at least one second coordinate, and the at least one first-order derivative comprises:

determining VA1 as MA1;

determining MB0 as MB1;

determining a sum of VA2 and an offset value as MA2, wherein the offset value is 0, a positive number, or a negative number; and obtaining MC1, MD1, MB2, MC2, and MD2 based on TH1, TH2, TH3, VA2, VA3, and GD3;

wherein the coefficients MC1, MD1, MB2, MC2, and MD2 are determined together.

* * * * *

UNITED STATES PATENT AND TRADEMARK OFFICE
CERTIFICATE OF CORRECTION

| | | |
|---|---|---|
| PATENT NO. | : 12,333,694 B2 | Page 1 of 1 |
| APPLICATION NO. | : 17/721602 | |
| DATED | : June 17, 2025 | |
| INVENTOR(S) | : Quanhe Yu et al. | |

It is certified that error appears in the above-identified patent and that said Letters Patent is hereby corrected as shown below:

In the Claims

In Column 54, Claim 2, Line 64, delete "$MC1=(3*VA2-2*GD1*h1-3*VA1-MB2*h1)/h1*h1$;" and insert -- $MC1= (3*VA2-2*GD1*h1-3*VA1-MB2 *h1) / (h1*h1)$; --, therefor.

Signed and Sealed this
Ninth Day of September, 2025

Coke Morgan Stewart
*Acting Director of the United States Patent and Trademark Office*